United States Patent
Wang

(10) Patent No.: US 7,120,541 B2
(45) Date of Patent: Oct. 10, 2006

(54) SONIC WELL LOGGING METHODS AND APPARATUS UTILIZING PARAMETRIC INVERSION DISPERSIVE WAVE PROCESSING

(75) Inventor: Canyun Wang, Norwalk, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 89 days.

(21) Appl. No.: 10/848,407

(22) Filed: May 18, 2004

(65) Prior Publication Data

US 2005/0261835 A1 Nov. 24, 2005

(51) Int. Cl.
*G01V 1/28* (2006.01)
(52) U.S. Cl. .......................... 702/11; 702/14
(58) Field of Classification Search .......... 702/6, 702/11, 12, 13
See application file for complete search history.

(56) References Cited

U.S. PATENT DOCUMENTS

| | | | | |
|---|---|---|---|---|
| 4,594,691 A | | 6/1986 | Kimball et al. ............... | 367/32 |
| 5,278,805 A | | 1/1994 | Kimball ........................ | 367/32 |
| 5,398,215 A | * | 3/1995 | Sinha et al. .................. | 367/31 |
| 5,687,138 A | * | 11/1997 | Kimball et al. ............... | 367/31 |
| 5,808,963 A | * | 9/1998 | Esmersoy ..................... | 367/31 |
| 5,999,484 A | * | 12/1999 | Kimball et al. ............... | 367/31 |
| 6,526,354 B1 | | 2/2003 | Bose et al. .................... | 702/14 |
| 6,614,716 B1 | * | 9/2003 | Plona et al. ................... | 367/31 |
| 6,920,082 B1 | * | 7/2005 | Tang ............................ | 367/31 |
| 6,957,572 B1 | * | 10/2005 | Wu ........................ | 73/152.16 |

OTHER PUBLICATIONS

Ekstrom, Michael P. *Dispersion Estimation from Borehole Acoustic Arrays Using a Modified Matrix Pencil Algorithm.* Presented at 29th Asilomar Conf. on Signals, Systems and Computers, Pacific Grove, CA (Oct. 31, 1995) pp. 449-453.

Esmersoy, Cengiz. *Inversion of P and SV Waves from Multicomponent Offset Vertical Seismic Profiles.* Geophysics, vol. 55, No. 1 (Jan. 1990) pp. 39-50.

Harrison, A.R. et al. *Acquisition and Analysis of Sonic Waveforms From a Borehole Monopole and Didpole Source for the Determination of Compressional and Shear Speeds and Their Relation to Rock Mechanical Properties and Surface Seismic Data.* SPE 20557. Paper presented at 65th Annual Tech. Conf. and Exhib. of SPE, New Orleans, LA (Sep. 23-26, 1990) pp. 267-282.

(Continued)

*Primary Examiner*—Donald McElheny, Jr.
(74) *Attorney, Agent, or Firm*—David P. Gordon; Jody Lynn DeStefanis; William L. Wang

(57) ABSTRACT

Methods and related apparatus for generating dispersion curves and conducting shear slowness logging are set forth. The methods include backpropagating detected dispersive waveforms in the Fourier domain while accounting for dispersion in an anisotropic and inhomogeneous formation, and stacking the processed waveforms. The stacking may occur in the frequency or time domains. The semblance of the stacked and windowed waveforms is compared against the detected waveforms. In accounting for dispersion during backpropagation, a plurality of parameters which describe dispersion curves are varied over ranges in order to optimize semblance. At each depth of interest, it is then possible to obtain a dispersion curve of greatest semblance. Where both an x-dipole and y-dipole are used to generate the waves, a dispersion curve of greatest semblance for each may be generated. In addition, from the dispersion curves, formation shear slowness(es) may be plotted as a function of formation depth and orientation.

60 Claims, 18 Drawing Sheets

OTHER PUBLICATIONS

Kimball, Christopher V. and Marzetta, Thomas L. *Semblance Processing of Borehole Acoustic Array Data. Geophysics*, vol. 49, No. 3 (Mar. 1984) pp. 274-281.

Lang, S. W. et al. *Estimating Slowness Dispersion from Arrays of Sonic Logging Waveforms. Geophysics*, vol. 52, No. 4 (Apr. 1987) pp. 530-544.

* cited by examiner

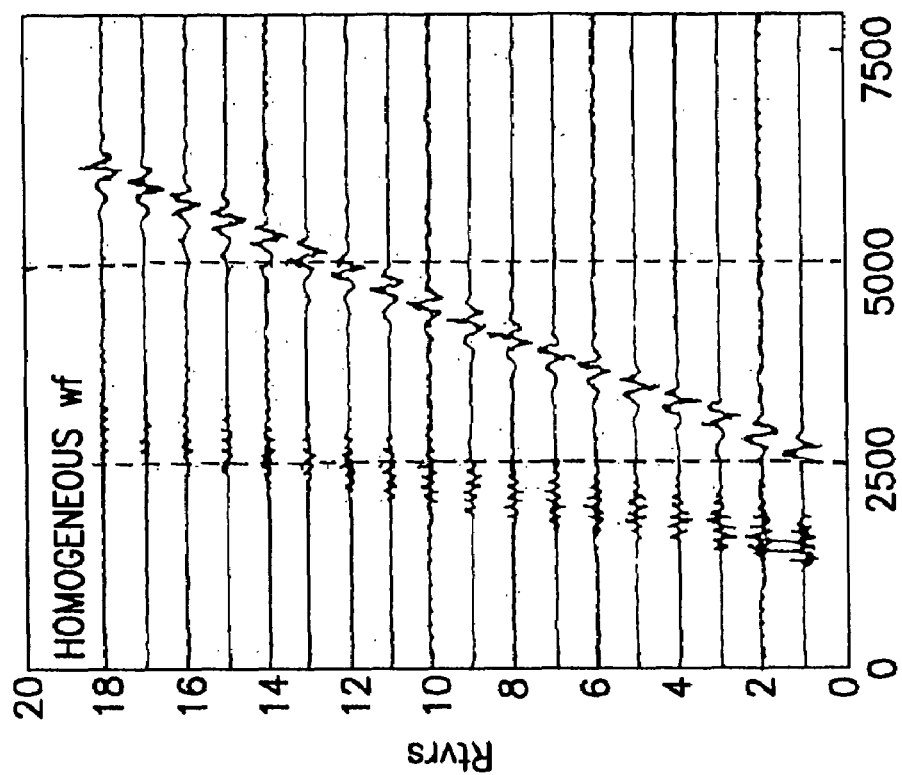
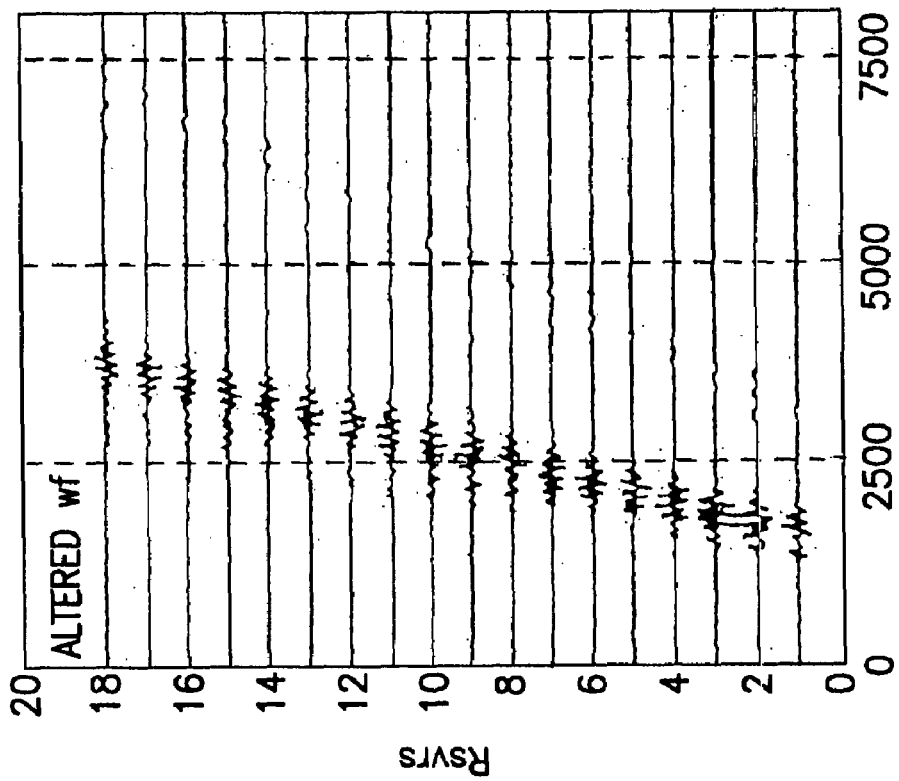

SONIC WELL LOGGING METHODS AND APPARATUS UTILIZING PARAMETRIC INVERSION DISPERSIVE WAVE PROCESSING

BACKGROUND OF THE INVENTION

1. Field of the Invention

This invention relates generally to sonic well logging. More particularly, this invention relates to sonic well logging techniques useful in quantifying subsurface parameters which are helpful in searching for and exploiting hydrocarbons and other valuable resources. The invention has particular application to determining dipole flexural dispersion curves as well as shear slowness of a formation via utilization and processing of dispersive wave information such as flexural waves.

2. State of the Art

Sonic well logs are typically derived from tools suspended in a mud-filled borehole by a cable. The tools typically include a sonic source (transmitter) and a plurality of receivers which are spaced apart by several inches or feet. Typically, a sonic signal is transmitted from one longitudinal end of the tool and received at the other, and measurements are made every few inches as the tool is slowly drawn up the borehole. The sonic signal from the transmitter or source enters the formation adjacent the borehole, and the arrival times and perhaps other characteristics of the receiver responses are used to find formation parameters. In most formations, the sonic speeds in the tool and in the drilling mud are less than in the formation. In this situation, the compressional (P-wave), shear (S-wave) and Stoneley arrivals and waves are detected by the receivers and are processed. Sometimes, the sonic speed in the formation is slower than the drilling mud; i.e., the formation is a "slow" formation. In this situation, there is no refraction path available for the shear waves, and the shear waves are typically not measurable at the receivers. However, the shear slowness of the formation is still a desirable formation parameter to obtain.

One sonic log of the art which has proved to be useful is the slowness-time coherence (STC) log. Details of the techniques utilized in producing an STC log are described in U.S. Pat. No. 4,594,691 to Kimball et al., as well as in Kimball, et al., "Semblance Processing of Borehole Acoustic Array Data"; Geophysics, Vol. 49, No. 3, (March 1984) pp. 274–281 which are hereby incorporated by reference in their entireties herein. Briefly, the slowness-time coherence log utilizes the compressional, shear, and Stoneley waves detected by the receivers. A set of time windows is applied to the received waveforms with the window positions determined by two parameters: the assumed arrival time at the first receiver, and an assumed slowness. For a range of values of arrival time and slowness, a scalar semblance is computed for the windowed waveform segments by backpropagating and stacking the waveforms and comparing the stacked energies to the unstacked energies. The semblance may be plotted as a contour plot with slowness and arrival times as axes, with maximum semblance values indicating the determined formation slowness value. In addition, local maxima of the semblance function are identified by a peak-finding algorithm, and the corresponding slowness values may be plotted as gray-scale marks on a graph whose axes are slowness and borehole depth. The intensity of the gray-scale marks is proportional to the height of the semblance peak.

As indicated in the aforementioned article and U.S. Pat. No. 4,594,691 to Kimball et al., the same backpropagation and stacking techniques are used regardless of whether the wave being analyzed is a P-wave, S-wave or a Stoneley wave; i.e., regardless of whether the wave is non-dispersive (P- or S-wave) or dispersive (e.g., Stoneley). However, while such backpropagation and stacking techniques may be optimal for non-dispersive waves, they are not optimal for dispersive waves. In response to this problem, several different approaches have been utilized. A first approach, such as disclosed in Esmersoy et al., "P and SV Inversion from Multicomponent Offset VSPs", Geophysics, Vol. 55; (1990) utilizes parametric inversion of the total waveform. However, this approach is not preferred because it is unreliable and computationally time consuming.

A second approach which was used commercially is disclosed in A. R. Harrison, et al., "Acquisition and Analysis of Sonic Waveforms From a Borehole Monopole and Dipole Source . . . ", SPE 20557, pp. 267–282, (Society of Petroleum Engineers, Inc. 1990), which is hereby incorporated by reference herein in its entirety. In the Harrison disclosure, the flexural waveform is processed as in the STC technique, but the non-dispersive processing results is corrected by a factor relating to the measured slowness; i.e., the STC results are post-processed. In particular, correction values are obtained by processing model waveforms with the STC techniques and comparing the measured slowness with the formation shear slowness of the model. The model waveforms assume a particular source and are bandlimited to a prescribed band (typically 1 to 3 KHz) before STC processing. Tables of corrections are designated by a particular source and processing bandwidth, and contain corrections as percentage-of-measured-value factors functions of measured value and hole diameter. The percentage correction required decreases with hole diameter and increasing formation slowness, and ranges from less than one percent to as much as fifteen percent. This approach, as did the parametric inversion approach, has its own drawbacks. In particular, the waveform spectra often disagree with those of the model. Further, the analysis band may exclude the majority of the flexural mode energy as well as reducing sensitivity to environmental parameters.

Other approaches such as first motion detection of flexural mode onset, and non-dispersive processing over a low frequency band, have also been utilized. Each of these approaches, however, has its own drawbacks. The flexural mode onset approach is driven by the realization that the fastest parts of the flexural mode dispersion curve approaches the formation shear slowness, and that the calculated moveout can be taken as the estimate of formation shear slowness. Problems with this technique include, among others, that: the flexural mode onset can be preceded by the compressional arrival; the early onset of the flexural wave may not propagate at the formation shear slowness because the flexural wave does not have energy at low frequencies; early time portions of arrivals have low energy content; measured flexural mode onsets practically never line up exactly in arrays with several receivers. The non-dispersive processing over a low frequency band approach is driven by the realization that the low frequency limit of the flexural mode dispersion curve is the formation shear slowness. Among the problems with the low frequency processing are that: with fixed array lengths, the resolution of the slowness measurement diminishes with frequency; generating significant flexural mode energy at low frequencies is extremely difficult; and road noise increases as the frequency decreases.

In U.S. Pat. No. 5,278,805 to Kimball, which is hereby incorporated by reference herein in its entirety, many of the issues with the previous techniques were resolved. The technique proposed by Kimball in the '805 patent is called dispersive STC or DSTC and has become commercially successful. According to the DSTC technique, a sonic tool is used to detect dispersive waves such as flexural or Stoneley waves. The signals obtained by the sonic tool are then Fourier transformed and backpropagated according to equations using different dispersion curves. The backpropagated signals are then stacked, and semblances are found in order to choose a dispersion curve of maximum semblance, thereby identifying the shear slowness of the formation. Formation shear slowness can then be plotted as a function of borehole depth.

In the Kimball patent, different embodiments are set forth. In one embodiment called quick DSTC or QDSTC, prior to Fourier transforming, the signals are stacked according to a previous estimation of slowness, and are windowed for maximum energy. The reduced set of data in the window are then extracted for Fourier transformation, and prior to backpropagation, multiplied by the estimation of slowness to reset them for backpropagation and stacking. In the standard DSTC embodiment, after the signals are backpropagated, the backpropagated signals are inverse Fourier transformed and windowed. In DSTC, semblance values may be plotted as a function of slowness and time. Regardless of embodiment, Kimball accounts for non-dispersive waves by using dispersion curves of constant value during backpropagation.

While DSTC represented a major improvement in the art, it has since been found by the present inventor that DSTC is not fully accurate. In particular, DSTC employs an assumption that the formation is homogeneous and isotropic, and thus the dispersion curves utilized by the backpropagation technique do not necessarily approximate the dispersion curve of the formation. Thus, when formations deviate from the isotropic, homogeneous formation assumption, the results generated by DSTC are not as accurate as desired.

SUMMARY OF THE INVENTION

It is therefore an object of the invention to provide techniques in slowness logging which account during processing for sonic wave dispersion by an inhomogeneous anisotropic formation.

It is another object of the invention to account for dispersion of an inhomogeneous anistropic formation in slowness logging by backpropagating the received waveforms and accounting for dispersion in the frequency domain.

It is a further object of the invention to provide techniques in slowness logging which are easily and quickly calculated.

It is an additional object of the invention to parameterize dispersion curves utilizing functions of at least a kick-in frequency and a flexion frequency and to utilize the parameterized dispersion curves in accounting for dispersion during slowness logging processing.

A further object of the invention is to provide techniques in slowness logging which yield dispersion curve answer products for locations in a borehole.

An additional object of the invention is to provide techniques in slowness logging of anisotropic formations which yield slowness answer products at different orientations about a borehole.

In accord with the objects of the invention, methods and related apparatus for conducting slowness logging are set forth. The methods broadly comprise backpropagating detected dispersive waveforms in the Fourier domain while accounting for dispersion in an anisotropic and inhomogeneous formation, and then stacking the processed waveforms. The stacking of the processed waveforms may occur in the frequency or time domains. The semblance of the stacked and windowed waveforms may then be compared against the detected waveforms. In accounting for dispersion during backpropagation, a plurality of parameters which describe dispersion curves are varied over ranges in order to optimize semblance. At each depth of interest, it is then possible to obtain a dispersion curve of greatest semblance. Where both an x-dipole and y-dipole are used to generate the waves, a dispersion curve of greatest semblance for each orientation may be generated. In addition, and if desired, from the dispersion curves, formation shear slowness(es) may be plotted as a function of formation depth and azimuthal orientation.

In accord with a preferred aspect of the invention, the parameters utilized in characterizing the dispersion curves include a normalized value for a kick-in frequency $\bar{f}_{kick}$ (the frequency at which the second derivative of the dispersion curve is a maximum), a normalized value for a flexion frequency $\bar{f}_{flex}$ (the frequency at which the first derivative of the dispersion curve is a maximum), a value for a slowness at a first normalized frequency $s(\bar{f}_1)$, and a value for a slowness at a second normalized frequency $s(\bar{f}_2)$. Preferably, the first normalized frequency is chosen to be zero or nearly zero, and second normalized frequency is chosen to be substantially greater than the normalized flexion frequency.

While according to the invention, time windowing is not necessary, in order to limit the amount of processing required, prior to Fourier transforming the detected waveform, time windowing can be utilized. Time windowing may be accomplished in various manners, including the manner utilized in DSTC.

Additional preferred aspects of the invention include the use of a dipole source in order to produce a large flexural wave signal (the flexural wave being a dispersive wave), and the use of an x-dipole source and a y-dipole source in order to obtain azimuthal information.

The apparatus of the invention relates closely to the methods of the invention.

Additional objects and advantages of the invention will become apparent to those skilled in the art upon reference to the detailed description taken in conjunction with the provided figures.

BRIEF DESCRIPTION OF THE DRAWINGS

FIGS. 5a-1 and 5b-1 are synthetic waveforms for altered and homogenous formations.

FIGS. 5a-2 and 5b-2 are backpropagated waveforms resulting from backpropagating the waveforms of FIGS. 5a-1 and 5a-2.

FIG. 6a is a log of the shear slownesses calculated according to the techniques of the invention for the x- and y-dipoles from depths of 3000 through 3500 in a formation.

FIG. 6b is a log of the relative amount of shear anisotropy shown by FIG. 6a.

FIG. 6c is a log of the amount of stress anisotropy calculable from the techniques of the invention along the indicated depths of the formation.

FIG. 6d is a log of relative alteration of the formation along the indicated depths of the formation.

FIGS. 7a and 7b are actual x-dipole and y-dipole non-rotated waveforms received at a depth of 3106 feet in a formation of FIG. 6a.

FIGS. 8a and 8b are actual x-dipole and y-dipole non-rotated waveforms received at a depth of 3048 feet in a formation of FIG. 6a.

FIGS. 9a and 9b are actual x-dipole and y-dipole non-rotated waveforms received at a depth of 3256 feet in a formation of FIG. 6a.

FIGS. 10a and 10b are actual x-dipole and y-dipole non-rotated waveforms received at a depth of 3138 feet in a formation of FIG. 6a.

FIGS. 11a and 11b are actual x-dipole and y-dipole non-rotated waveforms received at a depth of 3370 feet in a formation of FIG. 6a.

DETAILED DESCRIPTION OF THE PREFERRED EMBODIMENTS

Figure 1:
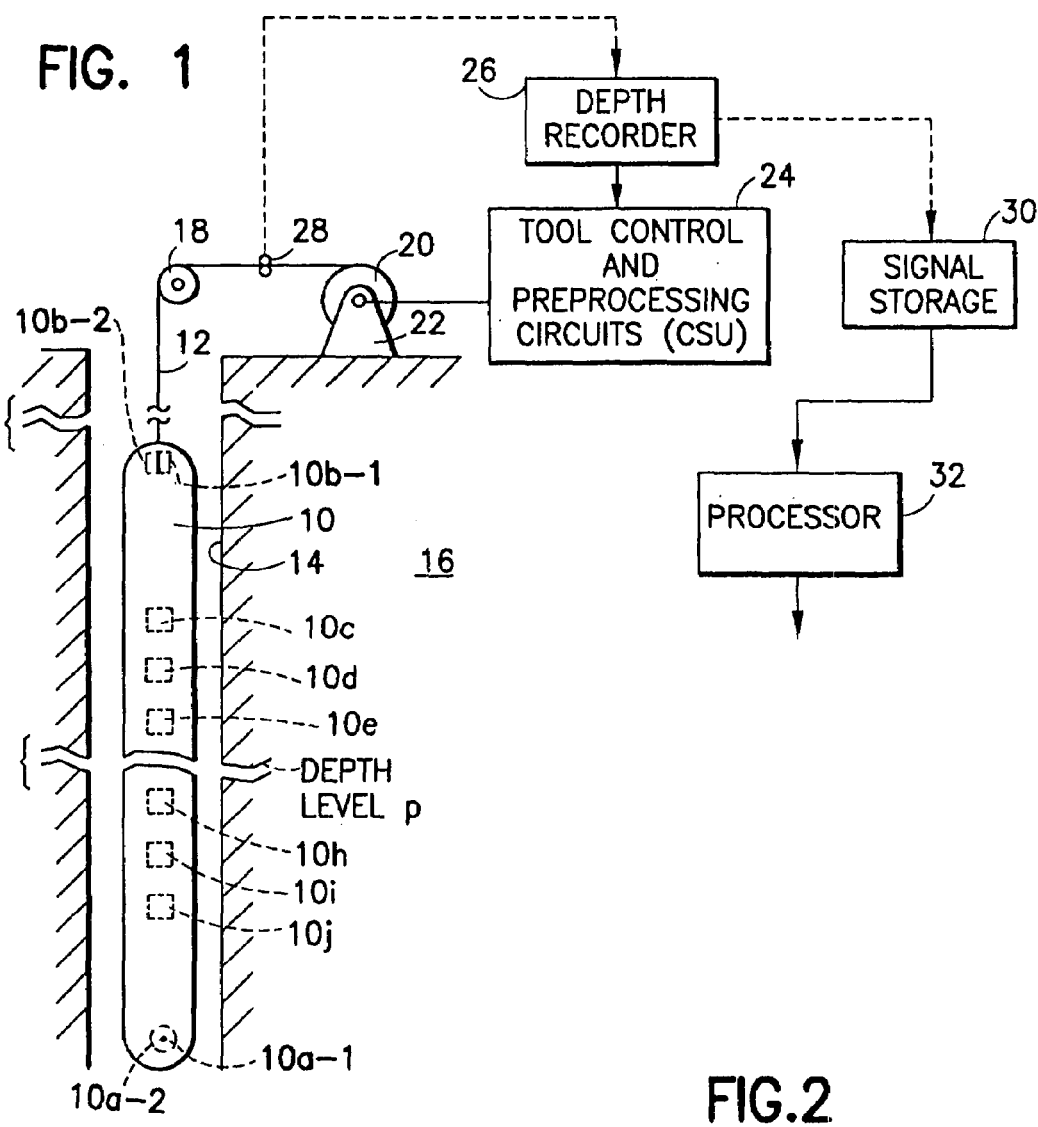
FIG. 1 is an overall schematic illustration of a logging system making use of an exemplary embodiment of the invention.

Referring to FIG. 1, an overall schematic illustration of a well logging system making use of the invention is seen. A sonic tool 10 is shown lowered on an armored multi-conductor cable 12 into a borehole 14 (cased or otherwise) to take sonic logs of a subsurface formation 16. Tool 10 is provided with at least one sonic source or transmitter 10a (either monopole or dipole), and a plurality of sonic receivers (either monopole or dipole). In the preferred embodiment of the invention, at least two dipole transmitters are provided, including a x-dipole transmitter and a y-dipole transmitter. In FIG. 1, tool 10 is shown with four dipole transmitters (including x-dipoles 10a-1 and 10b-1, and y-dipoles 10a-2 and 10b-2), and eight receivers 10c through 10j, it being appreciated that this is by way of example only and not intended to be limiting. The receivers are spaced along the length of tool 10 from each other and from the transmitter(s), and typically the distance between each transmitter and the receiver closest thereto is much greater than the inter-receiver distance. For example, the distance between the transmitter and the receiver nearest thereto is typically in the range of 5–25 feet, and the inter-receiver distance is typically less than half a wavelength of the sonic signal from the transmitter; e.g., about a half a foot to a foot.

Figures 6A, 6B, 6C, 6D:
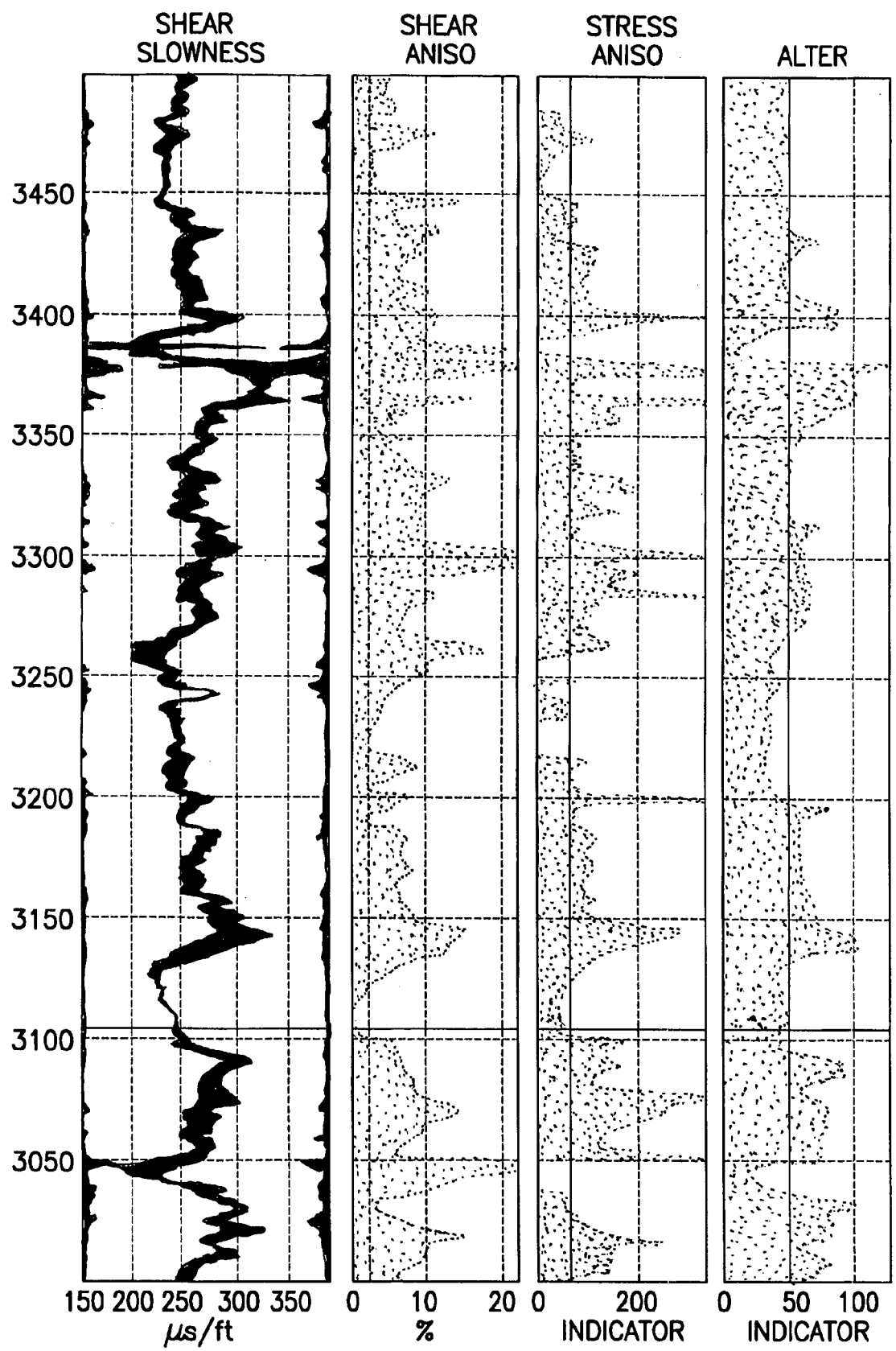

Tool 10 is adapted from movement up and down borehole 14, and as the tool 10 is moved, the transmitters 10a-1, 10a-2 periodically generate sonic signals. The generated sonic signals travel through the borehole and/or through the formation, and the receivers typically detect some energy which results from the generated signals. The mechanism for moving the tool 10 in the borehole includes the cable 12 which extends to the sheave wheel 18 at the surface of the formation, and then to a suitable drum and winch mechanism 20 which raises and lowers the tool 10 in the borehole as desired. Electrical connection between the transmitter and receivers on the one hand, and the surface equipment on the other hand, is made through suitable multi-element slipping and brush contact assembly 22 associated with the drum and winch mechanism 20. A unit 24 contains tool control and pre-processing circuits which send electrical signals to tool 10 and receive other electrical signals (sonic logs) therefrom via cable 12 and assembly 22. Unit 24 cooperates with a depth recorder 26 which derives depth level signals from depth measuring wheel 28 so as to associate the signals from receivers 10c through 10n with respective depth levels z in borehole 14. The outputs of sonic receivers 10c through 10n, after optional pre-processing in unit 24, are sent to signal storage 30, which can also receive signals from or through depth recorder 26 so as to associate sonic receiver outputs with respective depth levels z in borehole 14. Storage 30 can store the outputs of sonic receivers 10c through 10j in analog form but more typically stores them in the form of digital sonic log measurements, a set for each respective depth level z, derived by digitizing such analog signals, for example in unit 24. Storage 30 can comprise any of various storage media known in the art. The processing of the digitized log measurements is then accomplished by a computer or processor 32 which processes the information according to the techniques set forth below. The output of the processing preferably includes one or more dispersion curves (e.g., an x-shear dispersion curve and a y-shear dispersion curve) at each depth of interest (see. e.g., FIG. 7c, FIG. 8c, FIG. 9c), and a log (or logs) of formation slowness versus formation depth z as seen in FIG. 6a. In addition, logs of the relative amount of shear anisotropy (FIG. 6b), the amount of stress anisotropy (FIG. 6c), and the relative alteration of the formation (FIG. 6d) along the indicated depths of the formation may be generated.

Figure 2:
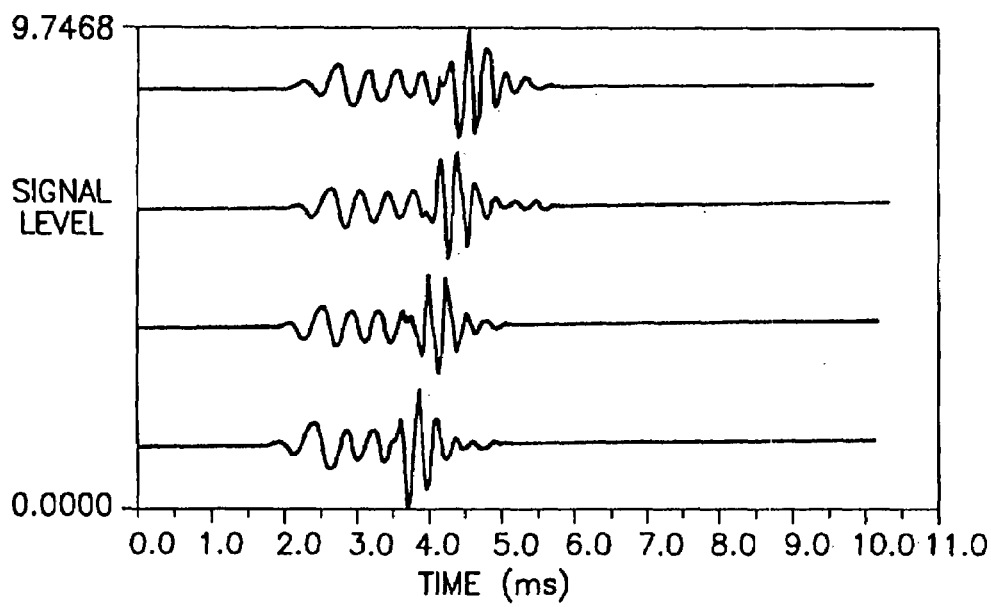
FIG. 2 illustrates waveforms on sonic signals received at a set of sonic receivers spaced from each other along the length of a sonic tool and from a transmitter carried by the same tool.

The response of any given one of receivers 10c through 10j to a sonic signal from a transmitter is typically a waveform of the general type illustrated in FIG. 2. As seen in FIG. 2, the responses of the several receivers are staggered in time due to the different spacing of the receivers from the transmitter. It will be appreciated that where the sonic signal detected is non-dispersive (e.g., P-waves and S-waves), the signal obtained at each receiver will take the same or similar form. However, where the sonic signal is dispersive (e.g., flexural waves), the signal obtained at the different receivers will appear different. Thus, the waveforms shown in FIG. 2 are illustrative of a dispersive wave. As discussed in more detail hereinafter, the primary waves of interest in the instant invention are the dispersive waves, such as flexural waves.

As mentioned in the Background section, in slow formations, it is possible that a shear wave signal is not detected by the receivers. Without a shear wave signal detection, a direct measurement of formation shear slowness is not possible. However, the formation shear slowness may be determined from measurements of dipole flexural mode. Particularly, in the special case of isotropic and homogenous formation, the formation shear slowness is related to other parameters according to the following:

$$S_P(f) = \text{Flexural}(D, V_s, R_{form}, R_{fluid}, V_{fluid}) \quad (1)$$

where $S_P(f)$ is the phase slowness of the formation, D is the diameter of the borehole, $V_s$ is the unknown shear wave velocity, $R_{form}$ and $R_{fluid}$ are the densities of the formation and borehole fluid, and $V_{fluid}$ is the borehole fluid velocity. Typically, the borehole diameter, the formation and borehole fluid densities, and borehole fluid velocity are known, may be assumed, or may be determined according to known techniques. As a result, if it is possible to measure the phase slowness of the formation via flexural wave measurements, then a determination of the formation shear velocity or slowness is possible. It should be understood that for an anisotropic and inhomogeneous formation, additional formation parameters beyond equation (1) are required to properly find the shear slowness.

Figure 4A:
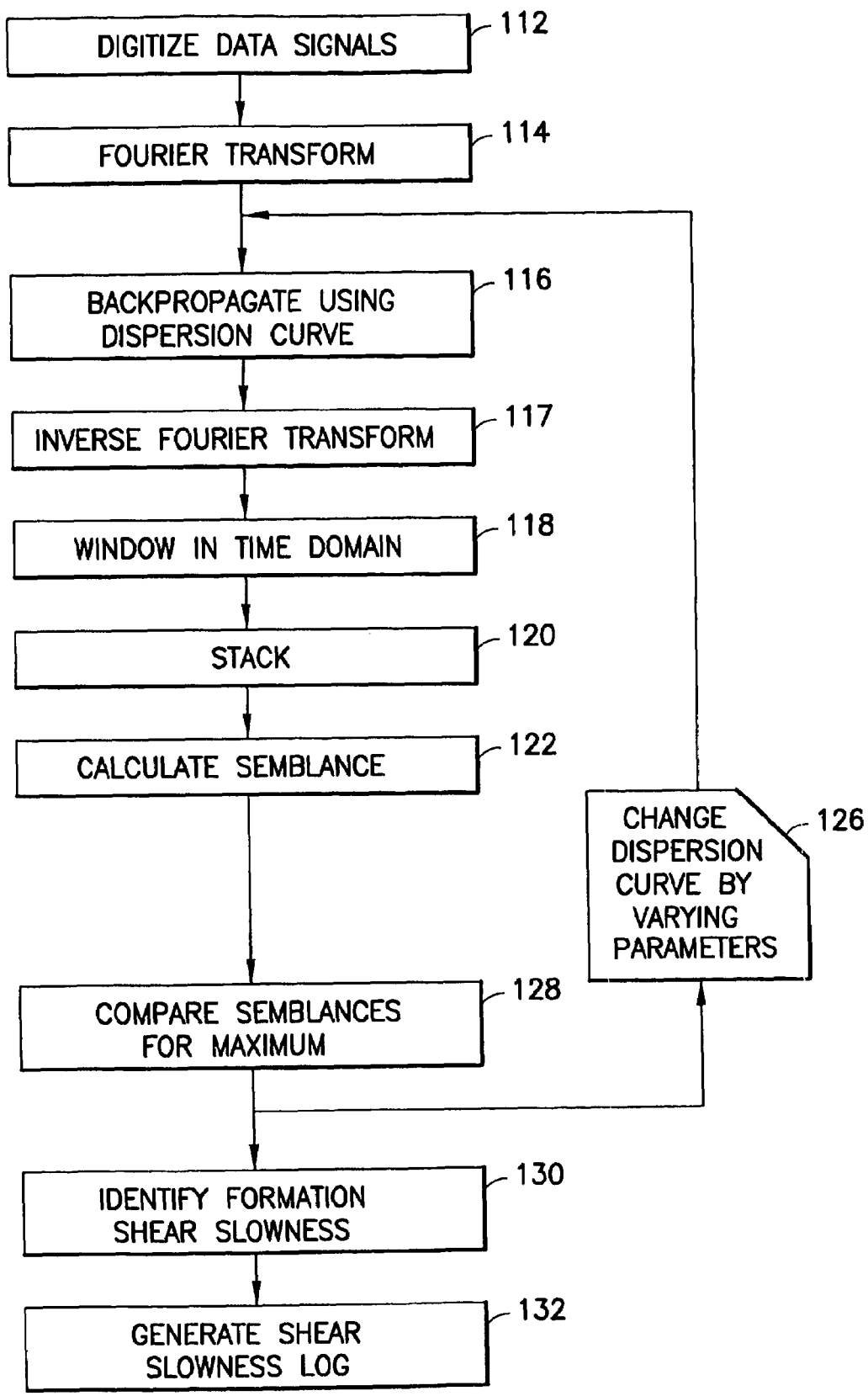
FIGS. 4a and 4b are block diagrams of the processing accomplished by the processing means of FIG. 1 according to two alternative embodiments of the invention.
Figure 4B:
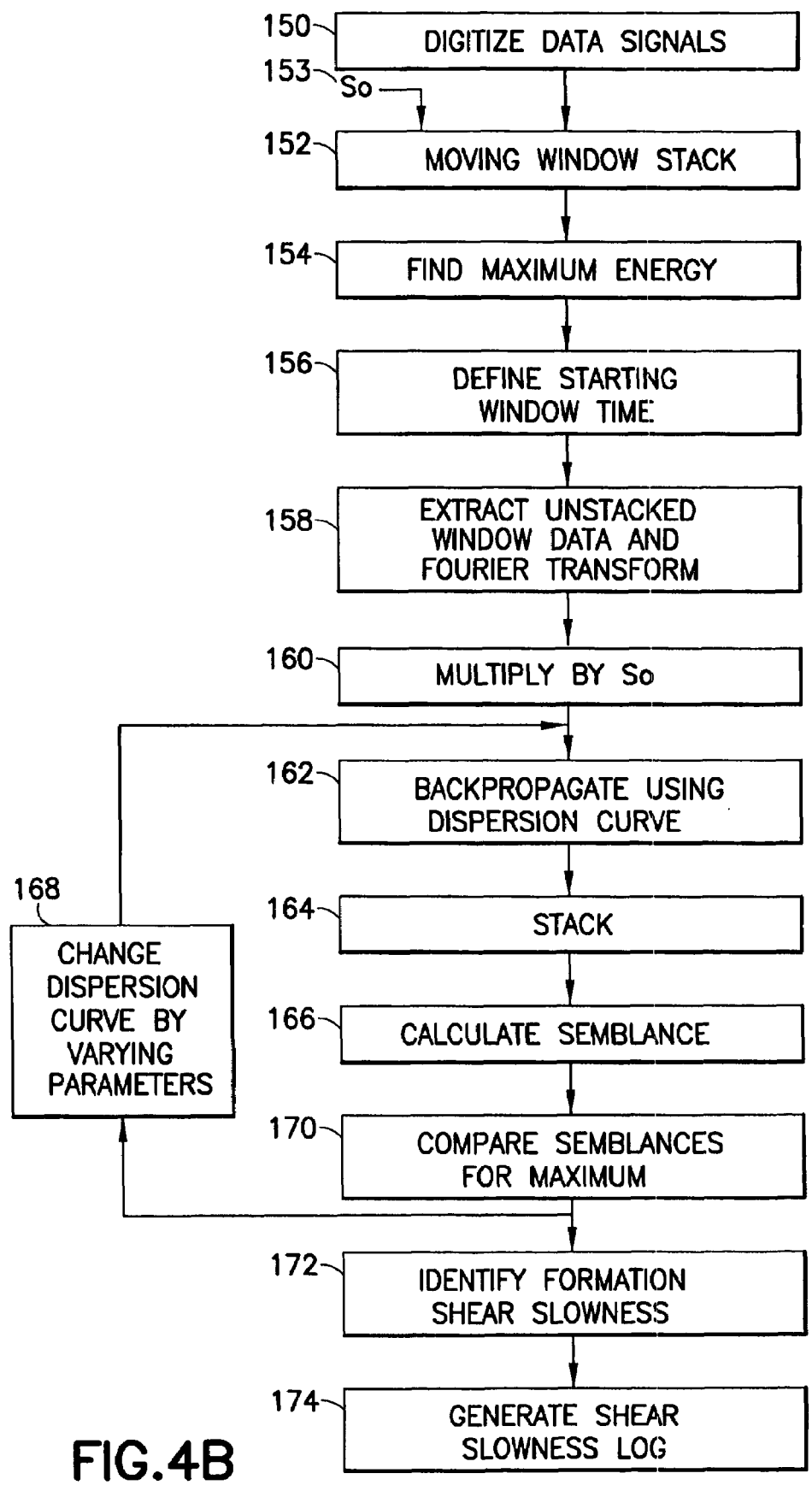

Before turning to FIGS. 4a and 4b which set forth methods of determining dispersion curves so that formation shear slowness may be determined, an understanding of the physics and mathematics governing the invention is helpful. In particular, an understanding of dispersion, and back-propagation and stacking (beamforming) is in order.

When a transmitter of a sonic tool is fired, the receivers measure waveforms representing the total borehole response. Based on experience and mathematical models, certain portions of the total response are identified as a "wave" or "arrival". Ideally, a wave would be an isolated wave packet which moves across the array at a recognizable slowness. Given the total response, the designation of a particular wave is an imprecise concept. In STC-type processing, the designation is made by specifying a particular moved-out time window in which certain properties (such as high semblance) are obtained. But the physics provides no assurance that such isolation can be performed. In general, a window contains components from many waves, and a particular wave is simply dominant in its window. The transmitter-to-first receiver distance in sonic tools has been selected to facilitate separation of waves of different slownesses by windowing. While the invention preferably assumes that the different types of waves are perfectly isolated by windowing, it will be appreciated that this assumption is not strictly true, and that additional techniques can be utilized to help distinguish between the different types of waves.

A propagating wave is often modeled in terms of its wavenumber k(f) which is, in general, a complex-valued function of frequency. If $A_i(f)$ is the amplitude spectrum of the waveform at the i-th receiver located at distance $z_i$ from the source, then the spectrum of the output $A_{i+1}(f)$ of the i+1-th receiver at a distance $z_{i+1}$ from the source is given by:

$$A_{i+1}(f) = A_i(f) e^{jk(f)(z_{i+1}-z_i)} \quad (2)$$

If the wavenumber k(f) is real, which preferably is assumed for purposes of this invention, then the exponential in equation (2) represents only a phase shift and the wave does not attenuate as it propagates. A possible further restriction on the wavenumber k(f) is that it is proportional to frequency; i.e., $$k(f) = 2\pi S f \quad (2a)$$

where S is the slowness of the wave in units of time/distance. If the propagating wave satisfies this restriction, the propagating wave is non-dispersive. Fourier transform relations show that a non-dispersive wave at position $z_{i+1}$ is simply a time-shifted (by $S(Z_{i+1}-Z_i)$) version of the wave at position $z_i$ as discussed above with reference to FIG. 2.

In many applications, a plot of the magnitude of k(f) versus frequency, f, is not instructive. Two more convenient parameters are the phase slowness, $S_P(f)$, and group slowness $S_G(f)$, where:

$$S_P(f) = k(f)/2\pi f \quad (3a)$$

$$S_G(f) = \left(\frac{1}{2}\bigg/\pi\right) dk(f)/df \quad (3b)$$

Figure 3:
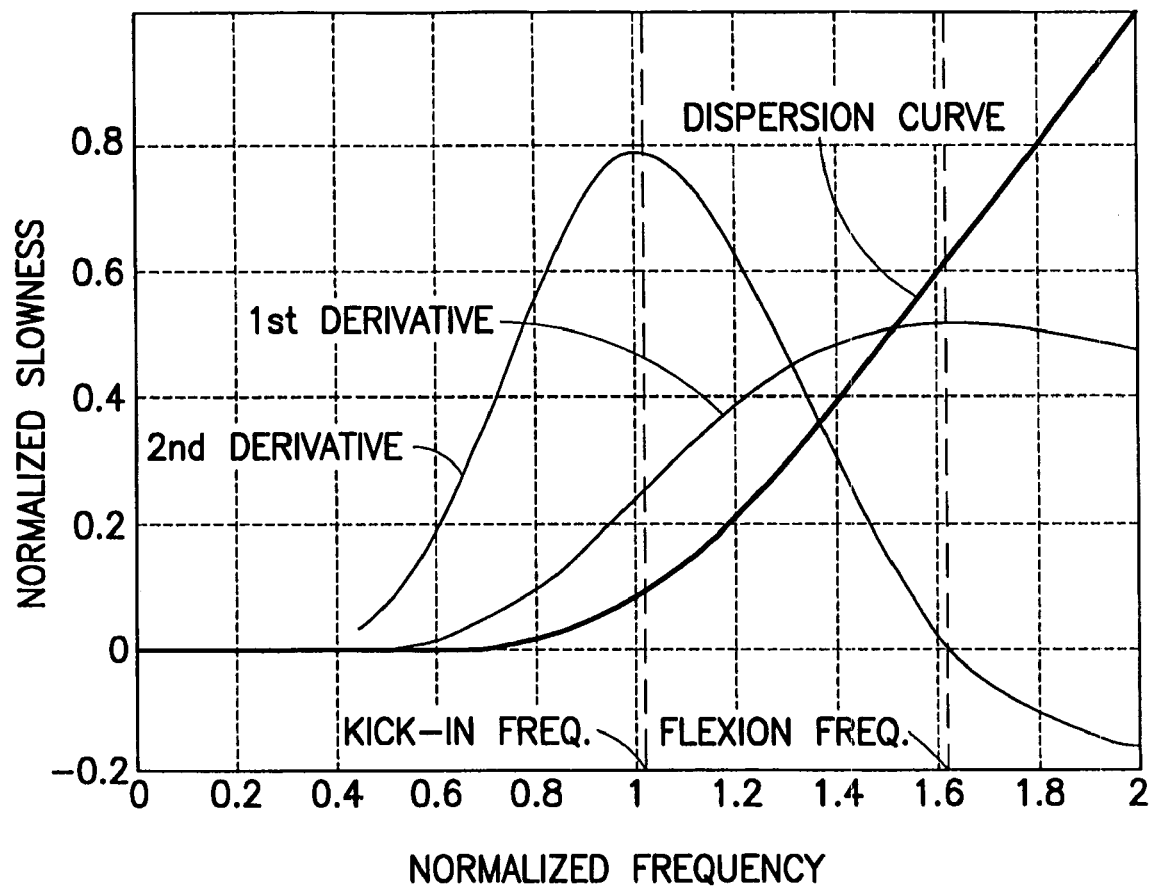
FIG. 3 is a plot of a normalized flexural dispersion curve along with its first and second derivatives.

$S_P(f)$ gives the slowness at which the phase of sinusoid at frequency f moves out with distance. $S_G(f)$ gives the slowness at which the envelope of a narrowband signal centered at frequency f moves out with distance. For a non-dispersive wave, $S_P(f)$ and $S_G(f)$ are equal and independent of frequency. For a propagating dispersive wave, $S_P(f)$ is known as the "dispersion curve". An example of a dispersion curve is seen in FIG. 3 which also shows first and second derivatives of the dispersion curve (where a maximum value for the first derivative is identified as the "flexion frequency", and the maximum value for the second derivative is called the "kick-in frequency"). While the instant invention, as set forth in more detail below, can utilize and provide results for non-dispersive waves, it will be appreciated that the dispersive waves are of primary interest. As will be discussed hereinafter, according to the preferred embodiment of the invention, the kick-in and flexion frequencies are two parameters utilized to characterize the dispersion curves.

In reality, in frequency bands of interest, the flexural mode can be highly dispersive; i.e., the phase and group delays can differ significantly. Dispersion-based distortion can easily be misinterpreted as being the result of two arrivals. At low frequencies (e.g., f less than 1.5 KHz), the dispersion is small, and the phase and group slowness are nearly equal to the formation shear slowness S. However, as discussed in the Background section hereto, excitation of the flexural mode at low frequencies is extremely difficult, and low frequency band processing has numerous difficulties.

Because dispersive waves are parameterized by more than one parameter, they are inherently more difficult to process for formation parameters than a non-dispersive wave. For non-dispersive waves, the dispersion "curve" has a constant phase slowness and a one-dimensional processing can estimate the wave slowness. For dispersive waves, the phase slownesses vary with frequency (as seen in FIG. 3) and depend on several formation parameters. Consequently, processing of a dispersive wave requires a multi-dimensional inversion of the data to determine formation parameters. In DSTC processing, all but the formation shear velocity or slowness is assumed known so that only a one-dimensional inversion is necessary. However, according to the preferred embodiment of the invention, dispersive waves are characterized by a plurality of parameters so that a multi-dimensional parameter inversion is necessary. In particular, by utilizing a Bessel function based parametric expression, it can be seen that empirical approximations of dispersive waves can be made using a plurality of parameters such as the kick-in frequency, the flexion frequency, and slowness values at a frequency below the flexion and kick-in frequency and at a frequency above the flexion and kick-in frequency.

If f denotes frequency, and s(f) denotes the slowness of a borehole dipole flexural mode, then the following may be defined: $s_0=s(f=0)$, $s_\infty=s(f\to+\infty)$. Physically, $s_0$ is the shear slowness of the virgin formation and $s_\infty$ is the slowness of the Scholte wave. A normalized frequency $\tilde{f}$ may then be defined by $$\tilde{f} = \pi D s_0 f \qquad (4a)$$

where D (the borehole diameter) is twice the borehole radius. A Bessel function based parametric expression is given by $$s(\tilde{f}) = s_0 + (s_\infty - s_0)\frac{J_{\alpha/\tilde{f}}(\beta)}{J_0(\beta)} \qquad (4b)$$

where $\alpha$ and $\beta$ are parameters and $J_{\alpha/\tilde{f}}$ is the Bessel function of the first kind with order of $\alpha/\tilde{f}$.

Those skilled in the art will appreciate that equation (4b) may be expressed within a normalized frequency band ($\tilde{f}_1 < \tilde{f} < \tilde{f}_2$) as $$s(\tilde{f}) = s(\tilde{f}_1) + [s(\tilde{f}_2) - s(\tilde{f}_1)]\frac{J_{\alpha/\tilde{f}}(\beta) - J_{\alpha/\tilde{f}_1}(\beta)}{J_{\alpha/\tilde{f}_2}(\beta) - J_{\alpha/\tilde{f}_1}(\beta)} \qquad (4c)$$

Mathematically the "local" expression (4c) is equivalent to the "global" expression (4b). The local expression (4c) allows inversion within the bandwidth ($\tilde{f}_1 < \tilde{f} < \tilde{f}_2$). In the preferred embodiment of the invention, the local expression is utilized.

The Bessel function based parametric expression is capable of accurately fitting dipole dispersion curves of arbitrary formations. It has been tested against many different dispersion curves and fits well in all the cases considered, including isotropic formations, intrinsic and stress induced anisotropic formations, and formations with alterations. Indeed, the fits are so good that hardly any difference can be seen between the analytical solution and the parametric expression. Thus, the Bessel function based parametric expression can be considered as an empirical approximation.

As previously mentioned, FIG. 3 illustrates a normalized dispersion curve along with its first and second order derivatives with respect to $\tilde{f}$. In FIG. 3, the normalized dispersion curve is defined as $$\tilde{s}(\tilde{f}) \equiv \frac{s(\tilde{f}) - s(\tilde{f}_1)}{s(\tilde{f}_2) - s(\tilde{f}_1)} = \frac{J_{\alpha/\tilde{f}}(\beta) - J_{\alpha/\tilde{f}_1}(\beta)}{J_{\alpha/\tilde{f}_2}(\beta) - J_{\alpha/\tilde{f}_1}(\beta)} \qquad (4d)$$

In the particular case of FIG. 3, the bandwidth from $\tilde{f}_1=0$ to $\tilde{f}_2=2$ is considered. The kick-in frequency, denoted by $\tilde{f}_{kick}$ is located at about 1.02. The flexion frequency, denoted by $\tilde{f}_{flex}$, is located at about 1.62. The kick-in and flexion frequencies are two key parameters defining the shape of any dispersion curve. In employing equation (4c), it is efficient to replace $\alpha$ and $\beta$ with the kick-in frequency $\tilde{f}_{kick}$ and flexion frequency $\tilde{f}_{flex}$. To do that, mapping functions $\alpha(\tilde{f}_{kick}, \tilde{f}_{flex})$ and $\beta(\tilde{f}_{kick}, \tilde{f}_{flex})$ should be computed.

A mapping can be achieved by computing one-dimensional arrays as follows. First, given a fixed $\alpha=\alpha_0$ and given an array $\beta=\beta_0$, the kick-in and flexion frequencies can be computed based on equation (4d). The arrays of kick-in and flexion frequencies are denoted by $\tilde{f}_{kick}{}^0$ and $\tilde{f}_{flex}{}^0$. Next, the array $\gamma=\tilde{f}_{flex}{}^0/\tilde{f}_{kick}{}^0$ is computed and saved. In doing so, two functions are obtained: $\beta_0(\gamma)$ and $\tilde{f}_{kick}{}^0$ ($\gamma$) (or arrays $\beta_0$ and $\tilde{f}_{kick}{}^0$ in correspondence with array $\gamma$).

Those skilled in the art will appreciated that $\beta(\tilde{f}_{kick}, \tilde{f}_{flex})=\beta_0(\gamma)$ with $\gamma=\tilde{f}_{flex}/\tilde{f}_{kick}$. In addition, $\alpha(\tilde{f}_{kick}, \tilde{f}_{flex})=\alpha_0 \tilde{f}_{kick}{}^0/\tilde{f}_{flex}{}^0(\gamma)$ with $\gamma 32\ \tilde{f}_{flex}/\tilde{f}_{kick}$. With $\alpha(\tilde{f}_{kick}, \tilde{f}_{flex})=\tilde{f}_{flex}/\tilde{f}_{kick}$. With $\alpha(\tilde{f}_{kick}, \tilde{f}_{flex})$ and $\beta(\tilde{f}_{kick}, \tilde{f}_{flex})$ equation (4d) may be rewritten as $$\tilde{s}(\tilde{f})=f(\tilde{f},\tilde{f}_{kick},\tilde{f}_{flex}) \qquad (4e)$$

which suggests that the shape (i.e., the slownesses) of the normalized dispersion curve is determined by parameters $\tilde{f}_{kick}$ and $\tilde{f}_{flex}$. Equation (4c) may also be rewritten as $$s(\tilde{f})=s(\tilde{f}_1)+[s(\tilde{f}_2)-s(\tilde{f}_1)]f(\tilde{f},\tilde{f}_{kick},\tilde{f}_{flex}) \qquad (4f)$$

which suggests that dispersion curves may be well characterized by four parameters: the slowness at a first normalized frequency $s(\tilde{f}_1)$, the slowness at a second normalized frequency $s(\tilde{f}_2)$, the normalized kick-in frequency $\tilde{f}_{kick}$, and the normalized flexion frequency $\tilde{f}_{flex}$. In accord with the preferred embodiment of the invention, the first normalized frequency is preferably chosen to be below the normalized kick-in frequency and the normalized flexion frequency, while the second normalized frequency is preferably chosen to be above the normalized kick-in frequency and the normalized flexion frequency. As will be discussed hereinafter, according to the invention, dispersion curves characterized by these four parameters are utilized in the back-propagation step of the invention.

A summary of semblance and mean-squared error concepts is helpful at this point. If $X_i(f)$ is the complex spectral value at frequency f at the i-th receiver of an array, i=1, ..., M, then the average complex spectral value Y(f) over the array is given by $$Y(f) = \frac{1}{M}\sum_{i=1}^{M} X_i(f) \qquad (5)$$

The average energy E(f) in the spectral components is given by $$E(F) = \frac{1}{M}\sum_{i=1}^{M} |X_i(f)|^2 \qquad (6)$$

where E(f) is a positive and real number. The semblance and normalized mean squared error at frequency f are defined by $$\rho(f) = \frac{|Y(f)|^2}{E(f)} \qquad (7)$$

-continued $$\varepsilon^2(f) = \frac{1}{ME(f)} \sum_{i=1}^{M} |X_i(f) - Y(f)|^2 \qquad (8)$$

Semblance is the ratio of the energy of the average spectral value to the average energy, the normalized mean-squared error is the average error between the spectral values and the average, normalized by the average energy. Values of $\rho(f)$ and $\varepsilon^2(f)$ at a particular frequency are sometimes called the "point" semblance or the "point" normalized mean squared error at the frequency. Semblance and the normalized mean squared error are simply related by $$\varepsilon^2(f) = 1 - \rho(f) \qquad (9)$$

so that minimizing normalized means squared error as a function of a parameter, such as slowness, is equivalent to maximizing the semblance as a function of that parameter. Given values of $\rho(f)$ and $\varepsilon^2(f)$ over a range of frequencies F, the overall semblance and normalized mean-squared error (NMSE) can be found:

$$\rho = \frac{\int E(f)\rho(f)df}{\int E(f)df} \qquad (10)$$

$$\varepsilon^2 = \frac{\int E(f)\varepsilon^2(f)df}{\int E(f)df} \qquad (11)$$

where the integrations are over a range of frequencies F. For the overall semblance and overall NMSE, $\varepsilon^2 = 1 - \rho$. Here, the choice of whether to derive an expression in terms of the semblance or mean-squared error has been made to simplify the derivation.

Turning to the beamforming theory, when a non-attenuating dispersive wave with dispersion curve $S_a(f)$ propagates past a linear array of M equally spaced (by a distance $\delta$) receivers, the complex spectrum at the i-th receiver is given by:

$$A_i(f) = A(f)e^{j2\pi f S_a(f)\delta(i-1)} \qquad (12)$$

for $i=1, \ldots, M$. A beamformer has a stacked output Y(f) at a frequency f which is the summation of phase-shifted (by $\theta(f,i)$) receiver spectral values:

$$Y(f) = \sum_{i=1}^{M} A_i(f)e^{j\theta(f,i)} \qquad (13)$$

Assume that the data is processed by beamforming based on a second dispersion curve $S_b(f)$; i.e., $$\theta(f,i) = -j2\pi f S_b(f)\delta(i-1) \qquad (14)$$

where $S_b$ can be characterized by a plurality of parameters (e.g., $s(\bar{f}_1)$, $s(\bar{f}_2)$, $\bar{f}_{kick}$, and $\bar{f}_{flex}$). Then, the backpropagated wave for each receiver which takes into account the parametrically characterized dispersion curve is:

$$X_i(f) = A_i(f)e^{-j2\pi f S_b(f)\delta(i-1)} \qquad (15)$$

Substituting equation (12) into equation (15) yields:

$$X_i(f) = A(f)e^{-j2\pi f(S_a(f) - S_b(f))\delta(i-1)} \qquad (16)$$

For the dispersion curve $S_b(f)$, semblance of the beamformer output at frequency f is:

$$\rho_B(f) = \frac{\frac{1}{M}\left|\sum_{i=1}^{M} X_i(f)\right|^2}{M\left|\sum_{i=1}^{M} X_i(f)^2\right|} \qquad (17)$$

where the numerator of equation (17) is the stack at frequency f.

Substituting equation (16) into equation (17) and simplifying the geometric series yields:

$$\rho_B(f) = \frac{1}{M^2} \frac{\sin^2 M\pi f\delta(S_a(f) - S_b(f))}{\sin^2 \pi f\delta(S_a(f) - S_b(f))} \qquad (18)$$

From equation (10), the overall semblance for the parametrically-characterized dispersion curve $S_b(f)$ is the weighted integral of equation (18) over frequency:

$$\rho_B(S_a, S_b) = \frac{1}{UM^2} \int |A(f)|^2 \frac{\sin^2 M\pi f\delta(S_a(f) - S_b(f))}{\sin^2 \pi f\delta(S_a(f) - S_b(f))} df \qquad (19)$$

where $$U = \int |A(f)|^2 df \qquad (20)$$

Both integrals are over frequency interval F. Equation (19) contains no approximations. If $S_a(f) = S_b(f)$ for all f, then the arguments to the sine functions in equation (19) are zero, and the ratio of the squared sine function is $M^2$, and $\rho=1$. In other words, if a dispersion curve ($S_b(f)$) has been chosen which matches the actual dispersion curve of the formation, the semblance will be one, and the beamformer error will be zero. It will be appreciated that it is the object of the invention to apply different dispersion curves during the backpropagation so that a dispersion curve which most closely matches the actual dispersion curve of the formation is found. The different dispersion curves are generated by utilizing a plurality of parameters which describe the dispersion curves and varying the parameters over ranges until a maximum semblance is obtained. The dispersion curve with the maximum semblance is the dispersion curve which most closely matches the actual dispersion curve of the formation. With the dispersion curve found, the shear slowness of the formation may also be determined. Typically the shear slowness is taken as the slowness of the dispersion curve at 0 frequency.

It will be appreciated that equation (19) can be simplified by making a Taylor series expansion around the argument of the sine functions of equation (19), and utilizing the first and, if desired, the second Taylor series terms.

The mathematics which helps define the preferred processing of the received waveform data so as to accurately account for dispersion during the backpropagation process is best understood by reference to the standard STC processing. In particular, standard non-dispersive STC processing calculates the semblance over a two dimensional grid of slowness, S, and window starting time, T, according to:

$$\rho(S, T) = \frac{1}{M} \frac{\int_T^{T+T_w} \left| \sum_{i=1}^{M} a_i(t+S(i-1)\delta) \right|^2 dt}{\sum_{i=1}^{M} \int_T^{T+T_w} |a_i(t-S(i-1)\delta)|^2 dt} \quad (21)$$

where $a_i(t)$ is the output time waveform from the i-th receiver, i=1, ..., M, δ is the inter-receiver spacing, and $T_w$ is the time window length. In commercial processing, $T_w$ is different for monopole and dipole waveforms. Contour plots of ρ(S,T) are a widely used analytic tool and are called ST plots. For logging, STC processing performs a constrained search on ρ(S,T) over the slowness-time plane, identifying local maxima as arrivals, and outputting their slowness coordinate. Implementation of STC is traditionally done in the time domain for computation speed.

In accord with the invention, equation (12) can be viewed in a more general way by recognizing that the time shifted waveforms $a_i(t+S(i-1)\delta)$ are backpropagated versions (at a non-dispersive slowness, S) of the received waveforms $a_i(t)$. If the Fourier transform of x(t) is indicated by F[x(t)]=X(f), and the inverse Fourier transform is denoted by $F^{-1}[X(f)]$, then if $A_i(f)=F[a_i(t)]$, by the Fourier time shifting property:

$$a_i(t+S(i-1)\delta) = F^{-1}[A_i(f)e^{-j2\pi fS(i-1)d}] \quad (22)$$

The term in the brackets on the right hand side of equation (22) is the backpropagated spectrum $X_i(f)$ of equation (15) for a non-dispersive wave of slowness S.

Generalizing equation (22) to allow backpropagation by a dispersive wave is accomplished by replacing S with a dispersion curve $S_P(f, s(\tilde{f}_1), s(\tilde{f}_2), \tilde{f}_{kick}, \tilde{f}_{flex})$ parameterized by $s(\tilde{f}_1)$, $s(\tilde{f}_2)$, $\tilde{f}_{kick}$ and $\tilde{f}_{flex}$. Thus, $$x_i(t) = F^{-1}[A_i(f)e^{-j2\pi fS_P(f,s(\tilde{f}_1),s(\tilde{f}_2),\tilde{f}_{kick},\tilde{f}_{flex})(i-1)\delta}] \quad (23)$$

Replacing $a_i(t+S(i-1)\delta)$ in equation (21) with $x_i(t)$ gives the semblance for the STC processing according to the invention which accounts for dispersion in the backpropagated process, such that:

$$\frac{1}{MU(S,T)} \int_T^{T+T_w} \left| F^{-1}\left[ \sum_{i=1}^{M} A_i(f)e^{-j2\pi fS_P(f,s(\tilde{f}_1),s(\tilde{f}_2),\tilde{f}_{flex},\tilde{f}_{kick})(i-1)\delta} \right] \right|^2 dt \quad (24)$$

where $$U(S,T) = \sum_{i=1}^{M} \int_T^{T+T_w} \left| F^{-1}\left[ A_i(f)e^{-j2\pi fS_P(f,s(\tilde{f}_1),s(\tilde{f}_2),\tilde{f}_{kick},\tilde{f}_{flex})(i-1)\delta} \right] \right|^2 dt, \quad (25)$$

This procedure will be known as shear parametric inversion or SPI (also Sπ). It will be appreciated that if $S_P(f, s(\tilde{f}_1), s(\tilde{f}_2), \tilde{f}_{kick}, \tilde{f}_{flex})=S$, then equations (21) and (24) are the same; i.e., equation (24) reduces to equation (21). In other words, if the dispersion curve is constant (i.e., the wave is non-dispersive), then backpropagation proceeds according to the prior art STC model. Likewise, if the formation is isotropic and homogeneous in the area of investigation, then the results of backpropagation using SPI will be equivalent to the results utilizing DSTC providing the flexural wave model used in DSTC corresponds well to the flexural wave being defined by $s(\tilde{f}_1)$, $s(\tilde{f}_2)$, $\tilde{f}_{kick}$ and $\tilde{f}_{flex}$.

Because the SPI processing according to equation (24) requires an inverse Fourier transform which accounts for four parameters in order to invert the averaged spectrum, and an inverse transform of each backpropagated waveform in order to calculate U(S,T), it will be appreciated that it is desirable to reduce the amount of processing required. Thus, starting guesses are provided for each of the four parameters, and ranges for the parameters are defined. In particular, it has been found that $\tilde{f}_{kick}$ will often have a value of approximately 1 and $\tilde{f}_{flex}$ will often have a value of approximately 1.6; and so, those values can be used as starting values. Generally, all flexural waves which will be encountered in formations of interest will have an $\tilde{f}_{kick}$ of between 0.5 to 1.5, and an $\tilde{f}_{flex}$ of between 1 to 2.5, so that those values may be chosen as range limits. The values for the normalized frequencies are typically either preset (e.g., $(\tilde{f}_1)=0$, $(\tilde{f}_2)=2$) or chosen based on information regarding the logging frequency of the tool, and starting values and ranges for $s(\tilde{f}_1)$ and $s(\tilde{f}_2)$ can be preset, obtained based on known information about the borehole, or obtained by using techniques such as STC. Using the starting values, an optimization code such as IMSL BCPOL can be utilized to range the variables and find optimum values.

While such processing is practical, it will be appreciated that faster processing is desirable. In particular, the intensive processing required by SPI is incurred in returning the backpropagated spectra to the time domain for time windowing. If time windowing is eliminated; i.e., if the entire waveform at each receiver is used, then four-dimensional semblances can be calculated entirely in the frequency domain with a great time savings. Without time windowing, equation (24) simplifies to:

$$\rho(S) = \frac{1}{M} \frac{\int \left| \sum_{i=1}^{M} A_i(f)e^{-j2\pi fS_P(f,s(\tilde{f}_1),s(\tilde{f}_2),\tilde{f}_{kick},\tilde{f}_{flex})(i-1)\delta} \right|^2 df}{\sum_{i=1}^{M} \int \left| A_i(f)e^{-j2\pi fS_P(f,s(\tilde{f}_1),s(\tilde{f}_2),\tilde{f}_{kick},\tilde{f}_{flex})(i-1)\delta} \right|^2 df} \quad (26)$$

where the integrations are over the frequency band F. In equation (26) the waveforms are Fourier transformed only once. Further the denominator in equation (26) need only be computed if a semblance quality measure is desired. This technique is called unwindowed SPI and is usually faster then standard SPI processing.

The ability to quickly process waveforms using parameterized dispersion curves is the advantage of unwindowed SPI. However, the processing time advantage of unwindowed SPI is only an advantage if the results are accurate, and this would appear to depend on whether the waveforms contain only the flexural mode data or whether they also include other arrivals or noise. In order to gain the advantages of unwindowed SPI without losing accuracy due to other arrivals or noise, a second embodiment of the invention (called "Quick SPI" or QSPI) which also accounts for dispersion in the backpropagation is set forth.

According to the Quick SPI embodiment, only that part of the data that is within a linearly-moved-out time window is processed. The moveout of this window corresponds to an initial estimate $S_0$ of the arrival slowness. The starting time, $T_0$ is for the window is found by a search process. The windowed data is processed in a manner analogous to unwindowed SPI.

More particularly, QSPI starts with an initial slowness estimate $S_0$ which may be obtained in any desired manner.

For example, the procedures discussed above may be used to provide an initial slowness estimate, or any of the prior art procedures (including STC or DSTC) may be utilized. Given the initial slowness estimate, $S_0$, the time origin $T_0$ of the window is determined through a search called a time scan. The starting time $T_0$ is chosen so as to maximize the stacked energy $E_S(S_0,T)$ over a restricted time interval. Stacked energy rather than semblance is the default variable to be maximized because flexural mode is typically the highest energy arrival in the waveforms. The stacked energy at non-dispersive slowness $S_0$ and window starting time T is defined by $$E_S(S_0, T) = \int_T^{T=T_w} \left| \sum_{i=1}^{M} a_i(t + S_0(i-1)\delta) \right|^2 dt \qquad (27)$$

$T_0$ is defined as the window starting time T which maximizes $E_S(S_0,T)$ subject to the constraints $T_{start}(S_0) \leq T \leq T_{last}(S_0)$. The constraints $T_{start}(S_0)$ and $T_{last}(S_0)$ specify a time interval about the slowness-time line $T = SZ_{TR}$ where $Z_{TR}$ is the transmitter-to-first-receiver spacing in feet:

$$T_{start}(S_0) = S_0 Z_{TR} - T_{offset}$$

$$T_{last}(S_0) = (S_0 Z_{TR} - T_{offset}) + T_{width} \qquad (28)$$

where $T_{offset}$ and $T_{width}$ are time scan parameters and are analogous to the T limits in the STC peak-finding algorithm.

It should be appreciated that instead of maximizing the stacked energy $E_S(S_0,T)$, semblance $\rho(S,T_0)$ may be maximized, particularly for low level signals such as monopole compressional arrival.

Assuming that $S_0$, and $T_0$ have been found, then the windowed waveforms $w_i(t)$ are given by:

$$w_i(t) = a_i(t + T_0 + S_0(i-1)\delta) \qquad (29)$$

for $t = 0, \ldots, T_w$. If the Fourier transform of $w_i(t)$ is $W_i(f)$, then a power-of-two Fourier transform (FFT) computes $W_i(f)$.

The SPI parametric dispersion curves $S_P(f, s(\tilde{f}_1), s(\tilde{f}_2), \tilde{f}_{kick}, \tilde{f}_{flex})$, cannot be applied directly to $W_i(f)$ as in equation (21) because these spectra include the non-dispersive moveout at slowness $S_0$ introduced by the windowing operation of equation (29). The spectra of the windowed data after correcting for this moveout are:

$$w_i^0(f) = w_i(f) e^{j2\pi f S_0(i-1)\delta} \qquad (30)$$

Assuming the dispersion curve at slowness S is given by $S_P(f, s(\tilde{f}_1), s(\tilde{f}_2), \tilde{f}_{kick}, \tilde{f}_{flex})$, the QSPI semblance is given by:

$$\rho(S) = \frac{1}{MU} \int \left| \sum_{i=1}^{M} W_i^0(f) e^{-j2\pi f S_P(f, s(\tilde{f}_1), s(\tilde{f}_2), \tilde{f}_{kick}, \tilde{f}_{flex})(i-1)\delta} \right|^2 df, \qquad (31)$$

where $$U = \sum_{i=1}^{M} \int \left| [W_i^0(f) e^{-j2\pi f S_P(f, s(\tilde{f}_1), s(\tilde{f}_2), \tilde{f}_{kick}, \tilde{f}_{flex})(i-1)\delta}] \right|^2 df \qquad (32)$$

The integrals of equations (31) and (32) are over the frequency range $F = [f_{lower} \ldots f_{upper}]$. Conveniently, $f_{lower}$ may be chosen to correspond to $\tilde{f}_1$ and $f_{upper}$ may be chosen to correspond to $f_2$ (where $f_1$ and $f_2$ are associated with $\tilde{f}_1$ and $\tilde{f}_2$ through equation 4(a)). U is only needed to yield semblance as a normalized quality control measure or to provide a signal level indicator. In practice, calculation of U requires negligible processing time.

Based on the physics and mathematics set forth above, and turning now to FIG. 4a, a block diagram according to a first embodiment of the invention (SPI) is seen for processing with processor 32 the information obtained by the sonic receivers 10c–10j. In the processing of FIG. 4a, it is assumed that the source 10a-1 is a x-dipole source, source 10a-2 is a y-dipole source, sonic receivers 10c–10j are dipole receivers, and that the flexural wave is of primary interest. In accord with the first preferred embodiment of the invention, data signals received by the receivers of the tool are digitized at 112 and are Fourier transformed at 114 (via a fast Fourier transform—FFT) to provide frequency domain spectra. Each of the frequency domain spectra are then backpropagated at step 116 according to equation (15) where a first dispersion curve $S_b(f)$ is utilized in the backpropagation. The parameters of the first dispersion curve (e.g., $s(\tilde{f}_1)$, $s(\tilde{f}_2)$, $\tilde{f}_{kick}$, $\tilde{f}_{flex}$), are preferably stored in memory. The results of the backpropagations are then preferably retransformed into the time domain via an inverse FFT at step 117 to provide backpropagated signals which accounts for dispersion. At step 118, results are windowed to remove the effects of other waves such as P-waves, and at step 120, the windowed data for the detectors are stacked according to the numerator of equation (17). Then the overall semblance for the first dispersion curve is calculated at step 122 and stored. As will be discussed hereinafter, the semblance calculated at 122 will be compared at 128 to semblances of other dispersion curves in order to help in the search process and identify a maximum semblance.

In order to find the find a best-fit dispersion curve as well as the formation slowness, it is desirable that the backpropagation step 116 be repeated for a plurality of different dispersion curves until a best-fit curve is found. According to the invention, this is accomplished by varying the parameters which define the dispersion curves over ranges. Thus, a loop is shown where the dispersion curve is changed at step 126 by varying the parameters. For each different dispersion curve, the results of the backpropagation are preferably retransformed into the time domain prior to windowing and stacking. As previously described, the overall semblances for each dispersion curve are then calculated at step 122 and compared at 128. In accord with the preferred embodiment of the invention, the parameters of the dispersion curves are varied over their ranges utilizing a search algorithm until a maximum semblance is found. When a maximum semblance is found, the dispersion curve utilized to obtain that semblance is identified as the best-fit dispersion curve at 130. In addition, the formation shear slowness (preferably taken as the value of the slowness of the best-fit dispersion curve at 0 frequency) may be identified at step 130. If desired, a log of shear slowness over borehole depth z such a seen in FIG. 6a is generated at step 132. Likewise, a dispersion curve at each depth of interest may be generated (as seen, e.g., in FIGS. 7c, 8c, 9c, 10c, and 11c).

Steps 112–132 of FIG. 4a may be carried out for both x-oriented and y-oriented signals received by the receivers. As a result, and as described in more detail below, the best-fit dispersion curve found for the x-dipole generated signals and y-dipole generated signals may be different. Thus, two different best-fit dispersion curves are seen in FIGS. 8c, 9c, 10c, and 11c. Different best-fit dispersion curves are indicative of formation anistropy.

It will be appreciated that some of the steps of FIG. 4a may be varied. For example, it is not absolutely necessary to window the backpropagated results prior to stacking (i.e., unwindowed SPI). Thus, it is possible to stack in the Fourier domain, and to find semblances so as to identify the best dispersion curve and the formation shear slowness without ever returning to the time domain. It will be appreciated that processing according to FIG. 4a could be conducted on non-dispersive waves such as P-waves or shear waves. In such a case, the dispersion curves utilized in the backpropagation should be constant values.

Turning to FIG. 4b, a block diagram of the preferred processing according to the second preferred embodiment (QSPI) of the invention is seen. In the QSPI embodiment of FIG. 4b, the signals obtained by the receivers are digitized at 150 and are stacked at 152 based on a moveout dictated by an assumed slowness $S_0$ input 153 and in accord with equation (27). At step 154, the stacked signals are scanned by a moving or sliding window (e.g., of thirty-two data points) to find a maximum stacked energy for a window of given size. Based on the maximum stacked energy, at step 156 a starting window time is defined, and the windowed waveforms are defined according to equation (29). Based on the windows, the data is extracted; i.e., at step 158, the Fourier transform of the data window of each receiver is taken. It should be appreciated that the data windows are removed in time so that the data which is extracted for each receiver is at a different time relative to the data of an adjacent receiver. Because the extracted data window is based on time-removed windows, at step 160, the Fourier transformed window data is corrected for slowness by multiplying the data by the assumed slowness $S_0$. Then, at step 162, the slowness-corrected extracted data are backpropagated according to a first dispersion curve $S_a(f, s(\bar{f}_1), s(\bar{f}_2), \bar{f}_{kick}, \bar{f}_{flex})$. It should be appreciated that the correction for slowness $S_0$ can be incorporated into the backpropagation procedure if desired. The backpropagated data are then stacked at step 164, and the overall semblance is calculated at step 166. It will be appreciated that the stacking of the backpropagated extracted data is preferably accomplished in the Fourier domain as post-backpropagation-windowing is not required; the windowing having been done prior to backpropagation. Thus, not only is the computation time significantly decreased due to the original windowing which results in many fewer data points being Fourier transformed, but the computation time is significantly decreased because a reverse Fourier transform is not required.

In order to find best-fit dispersion curves as well as the formation slowness, it is desirable that the backpropagation step 162 be repeated for a plurality of different dispersion curves. Thus, a loop is shown, where the parameters of the dispersion curve are changed at step 168. For each different dispersion curve, the results of the backpropagations are stacked and the overall semblances calculated. In accord with the preferred embodiment of the invention, the parameters of the dispersion curves are varied over their ranges utilizing a search algorithm until a maximum semblance is found. The best-fit dispersion curve(s) is identified at step 172, and from the identified best dispersion curve, the formation shear slowness may likewise be identified at step 172 by taking the slowness of the dispersion curve at a desired frequency (e.g., 0 Hz). If desired, a log of shear slowness over borehole depth z such a seen in FIG. 6a is generated at step 174. Likewise, a dispersion curve(s) at each depth of interest may be generated (as seen, e.g., in FIGS. 7c, 8c, 9c, 10c, and 11c).

While the QSPI embodiment of FIG. 4b preferably conducts a moving or sliding window search for maximum stacked energy in the time domain prior to Fourier transform and backpropagation, it should be appreciated by those skilled in the art that such a pre-backpropagation windowing is not necessary if some additional processing is tolerable. In particular, a wider window which is not based on a moving search, but which is not certain to include the desired data could be utilized. That wider window data could then be extracted as discussed above. Alternatively, an even wider window could be utilized which does not include the offsets for the different receivers, but which still includes substantially less than the full data signal of typically five hundred twelve points. The data in this "non-extracted" window could then be Fourier transformed. Because the "non-extracted" window data were not extracted in a time offset manner, there would be no reason to multiply by $S_0$ prior to backpropagation according to the different dispersion curves.

Figures 2, 5B:
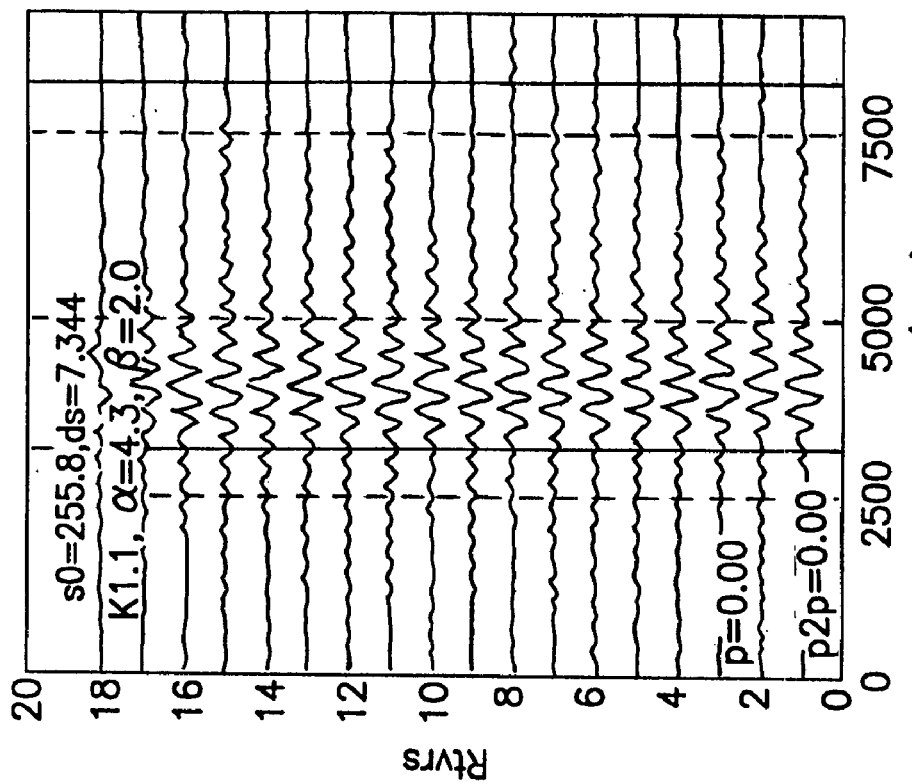
Figures 2, 5A:
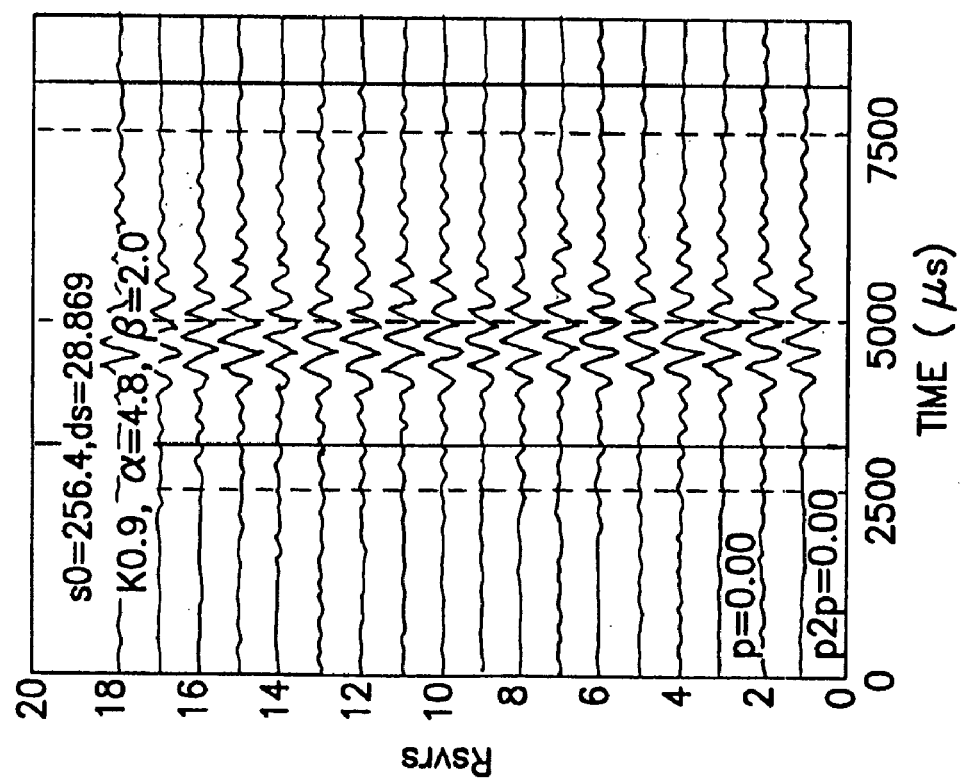
Figure 5D:
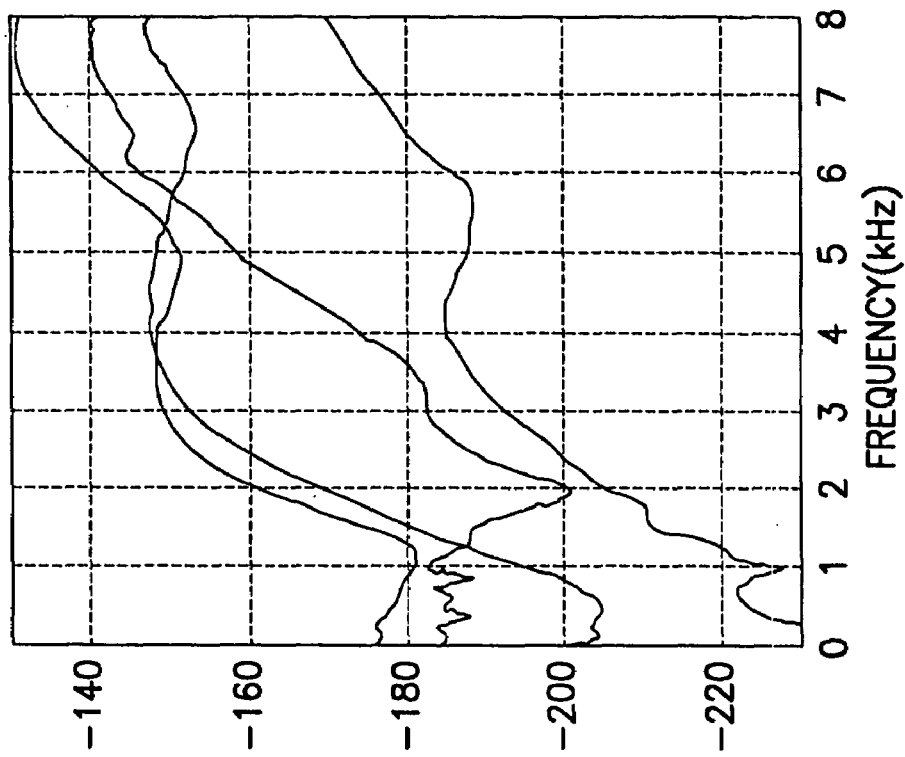
FIG. 5d is a companion plot to FIG. 5c showing signal energy to noise spectra.
Figure 5C:
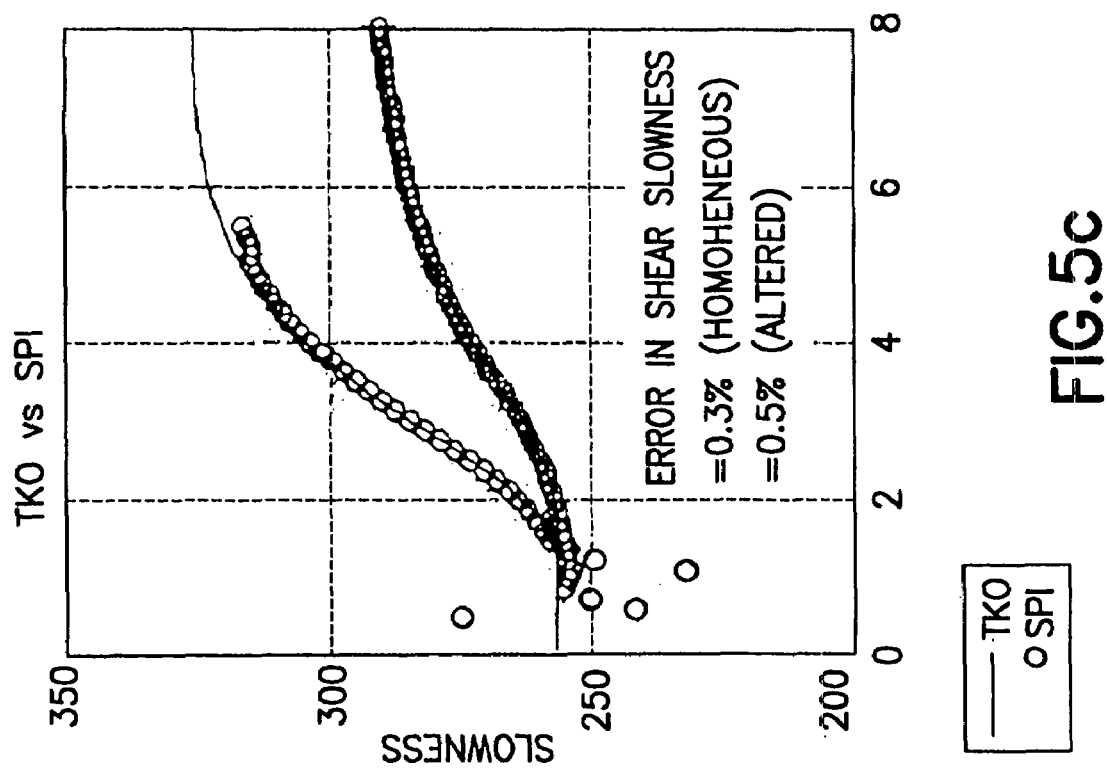
FIG. 5c shows dispersion curves determined from the backpropagated waveforms of FIGS. 5a-2 and 5b-2 utilizing the processing of the invention and results of another technique for comparison purposes.

Using the techniques of FIG. 4a, synthetic data was utilized to show the effectiveness of the invention. FIGS. 5a-1 and 5b-1 are synthetic waveforms for eighteen receivers for altered and homogenous formations respectively as generated by a finite difference code. In the altered formation, the shear slowness at the borehole interface was chosen to be 10% slower than the deep virgin shear slowness (e.g., a depth of one diameter of the borehole into the formation) although the formation density was assumed constant. As a result of SPI processing (as in FIG. 4a) according to the invention, dispersion curves characterized by the parameters $s(\bar{f})$, $s(\bar{f}_2)$, $\bar{f}_{kick}$, $\bar{f}_{flex}$ were utilized to backpropagate the received waveforms for both the altered and homogenous formation data sets until maximum semblances were found for each. The dispersion curves of maximum semblance are shown in FIG. 5c, and the backpropagated waveforms utilizing the dispersion curves of FIG. 5c are shown in FIGS. 5a-2 and 5b-2. The backpropagated waveforms in each of FIGS. 5a-2 and 5b-2 show excellent uniformity, confirming that the dispersion curves are appropriate.

As seen in FIG. 5c, the dispersion curve of the altered formation is steeper than that of the homogeneous formation. In addition, the slownesses of the altered and homogenous formations differ except at zero frequency. FIG. 5c also shows (utilizing circles as data points) shear slowness calculations for the modeled altered and homogeneous formations utilizing the TKO technique as described in Lang, S. W., Kurkjian, A. L., McClellan, J. H., Morris, C. F., and Parks, T. W., "Estimating Slowness Dispersion from Arrays of Sonic Logging Waveforms", Geophysics, Vol. 52, No. 4, April 1987 pp. 530–544. At higher frequencies, there is good agreement between SPI and TKO. At lower frequencies (at or below 1 kHz), TKO fails to produce reliable results (as seen by the scatter of the circles). Thus, calculations from TKO result with error as indicated.

Turning now to FIGS. 6a–6d, 7a–7c, 8a–8c, 9a–9c, 10a–10c, and 11a–11c, the techniques of the invention were carried out in a formation using a tool similar to the tool shown in FIG. 1, but having twelve receivers. In particular, using the borehole tool which was dragged through at least a portion of a borehole (e.g., from location 3000 feet to location 3050 feet), waveforms were obtained by each receiver every six inches. Selected examples of the non-rotated x-dipole and y-dipole waveforms are seen respectively in FIGS. 7a and 7b (at 3106.0 ft), 8a and 8b (at 3048.0 ft), 9a and 9b (at 3256.0 ft), 10a and 10b (at 3138.0 ft), and 11a and 11b (at 3370.0 ft). As will be discussed hereinafter, each depth shown in the Figures was selected for inclusion herein because the dispersion curves at that depth illustrate a point of interest.

Using the SPI technique, at each depth, the x-dipole data and the y-dipole data were separately processed by back-propagating the waveforms utilizing dispersion curves parameterized by the four parameters $s(\bar{f}_1)$, $s(\bar{f}_2)$, $\bar{f}_{kick}$, $\bar{f}_{flex}$ in order to find best-fit dispersion curves for each set of data. The best-fit dispersion curves for the x-dipole data and the y-dipole data (as seen in FIGS. 7c, 8c, 9c, 10c and 11c) (which are discussed in more detail below) were then used at each depth to find both an x-shear slowness and y-shear slowness at each investigated depth. The results of slowness determinations were then plotted as a log as seen in FIG. 6a, where the shear slownesses plotted are the shear slownesses taken at 0 Khz of the best-fit x- and y-dispersion curves.

As seen in FIG. 6a, at many depths along the investigated portion of the borehole, the x-shear slowness and the y-shear slowness are different; i.e., there is shear anisotropy. This difference is highlighted in FIG. 6a with the differences between the logs being filled in. The percent difference between the x-shear and y-shear slownesses along the investigated length of the borehole are also plotted in FIG. 6b. There it is seen that the differences can be over 20% (see, e.g., depth 3048 ft and depth 3380 ft).

In addition, using techniques such as disclosed in U.S. Pat. No. 6,614,716 to Plona et al., which is hereby incorporated by reference herein in its entirety, the dispersion curves at each depth were used to find indications of stress anisotropy at each depth. FIG. 6c is a log of the amount of stress anisotropy calculable from the techniques of the invention along the indicated depths of the formation.

Further, using techniques such as disclosed in U.S. Pat. No. 6,526,354 to Bose et al., which is hereby incorporated by reference herein in its entirety, the dispersion curves at each depth were used to find an indication of alteration at each depth. The alteration indicator is calculated by subtracting the formation slowness at 0 kHz from the formation slowness at 2.5 kHz and averaging the difference obtained for the x-dipole data and the y-dipole data. FIG. 6d is a log of relative alteration of the formation along the indicated depths of the formation, with the "average alteration" indicated as a dark line with an index of 50.

Figure 7B:
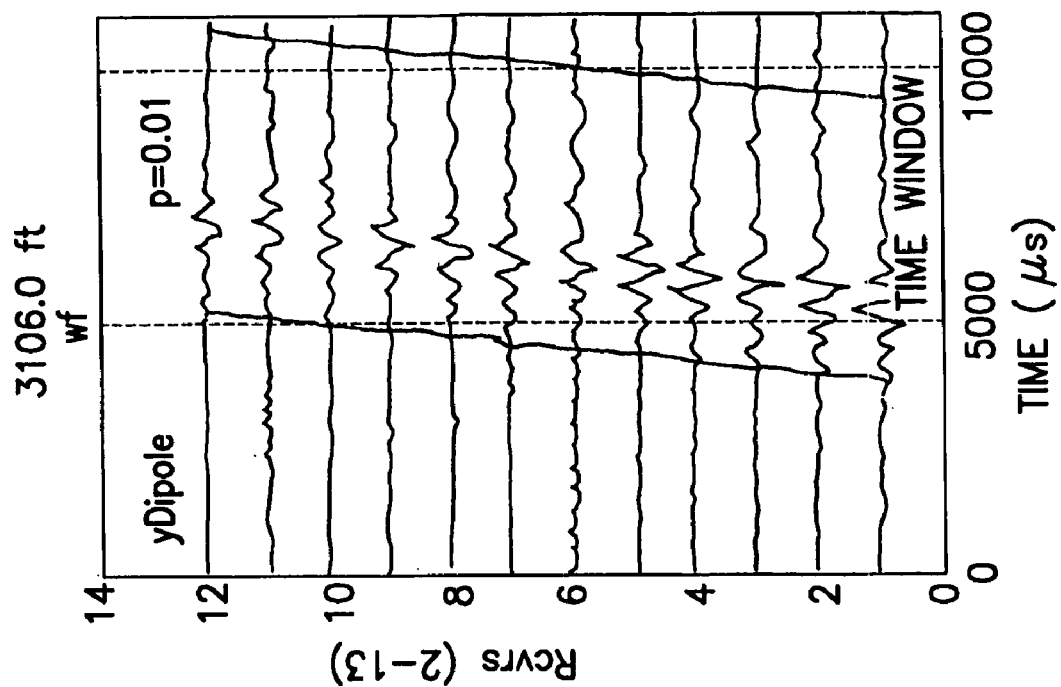
Figure 7A:
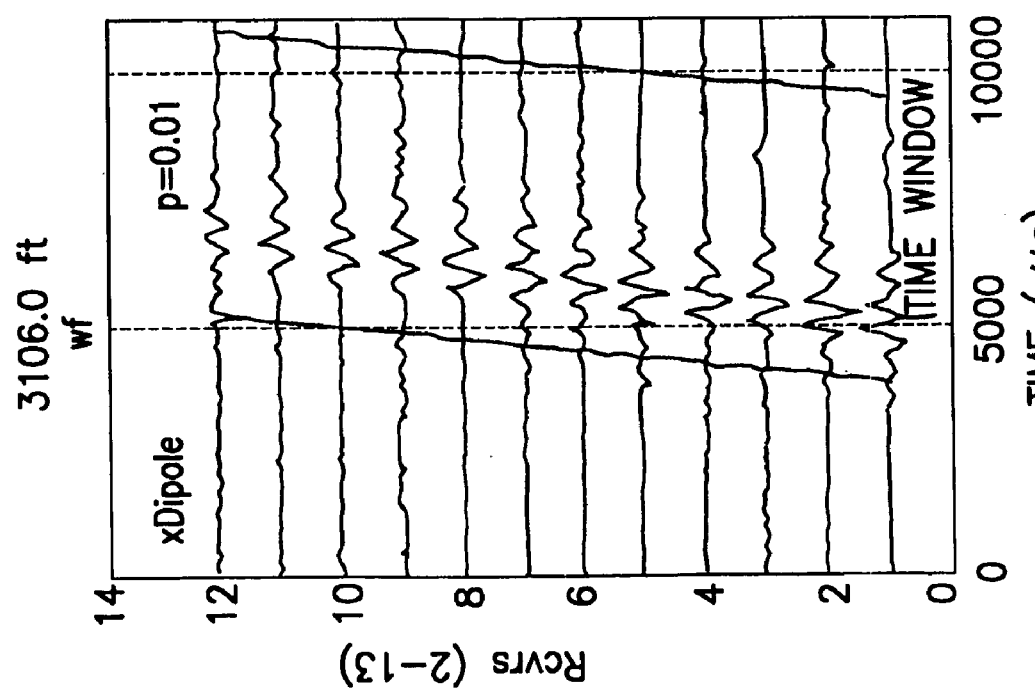
Figure 7C:
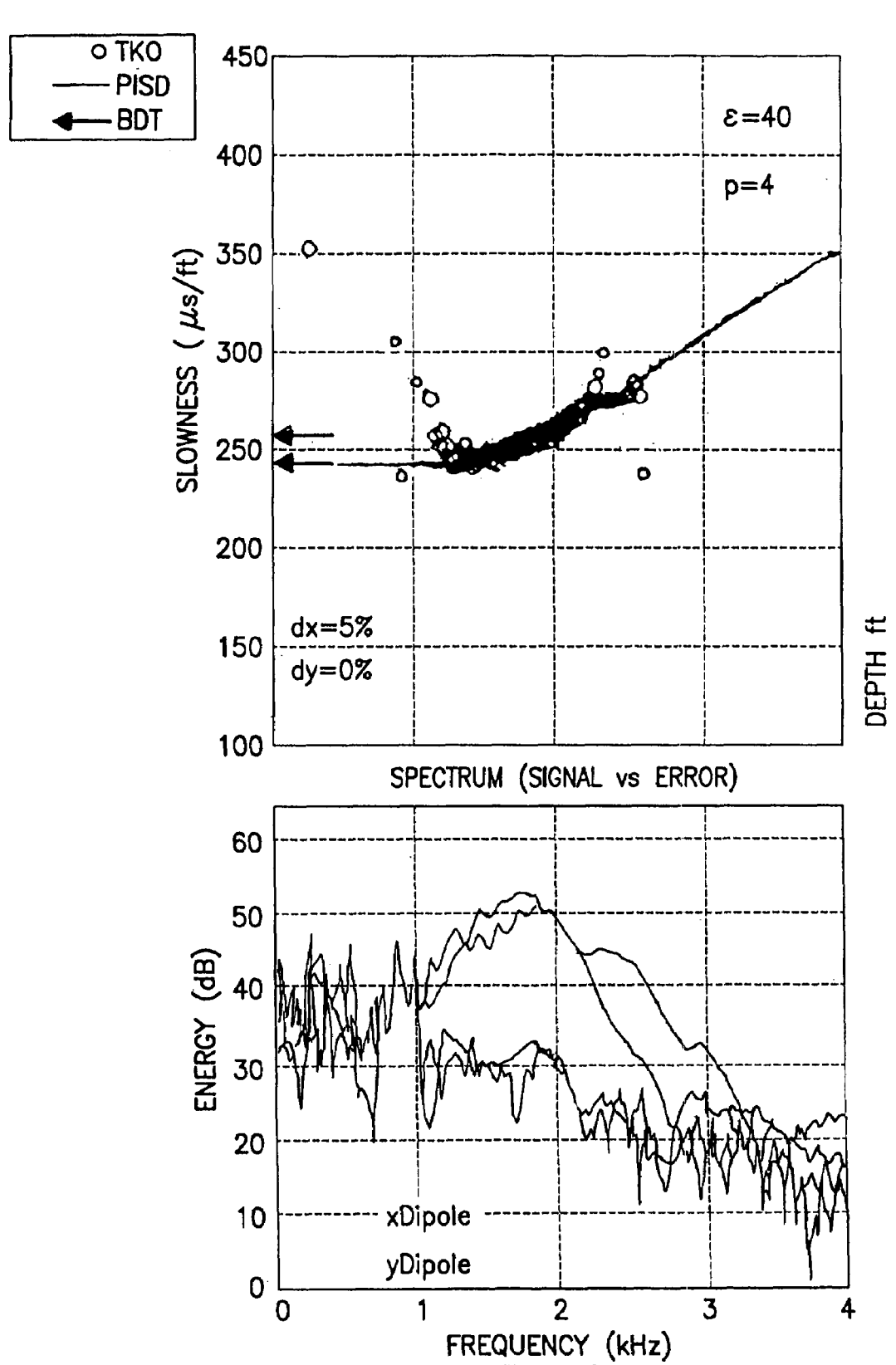
FIG. 7c shows dispersion curves calculated according to the invention for the waveforms of FIGS. 7a and 7b overlaid on results from other techniques.

Turning now to FIG. 7c, the dispersion curves calculated according to the invention for the waveforms of FIGS. 7a and 7b are shown and overlaid on results from other techniques. In particular, the arrows in FIG. 7c show the x-shear and y-shear slowness determinations at 3106.0 ft using the prior art DSTC technique, while the circles show results from TKO processing. As seen in FIG. 7c, the determinations of SPI indicate that the dispersion curves for the x-shear and y-shear are substantially identical; i.e., that the formation is substantially isotropic at 3106.0 feet with a slowness of approximately 248 μs/ft. As indicated, this differs from the results obtained by DSTC processing for the x-shear slowness by 5% although it is the same as the results obtained by DSTC processing for the y-shear slowness.

Figure 8B:
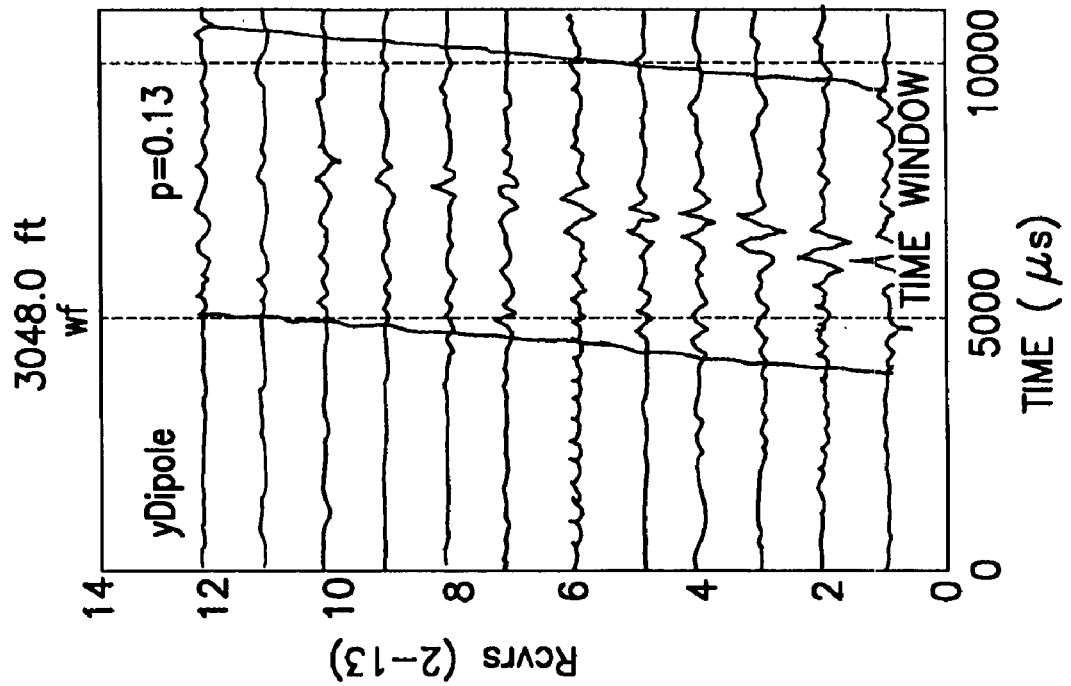
Figure 8A:
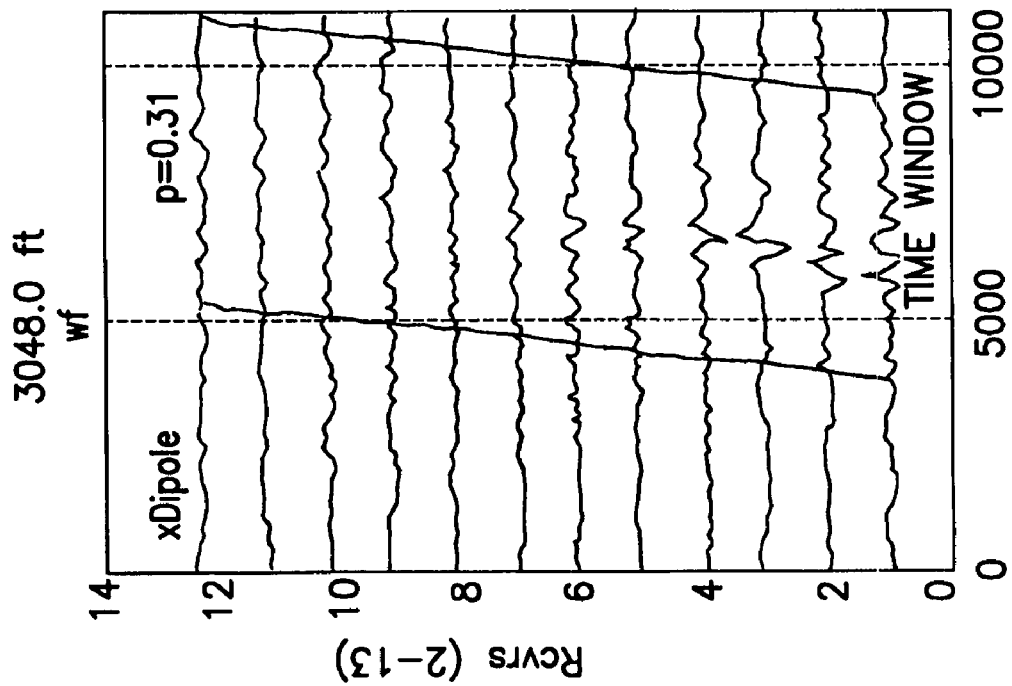
Figure 8C:
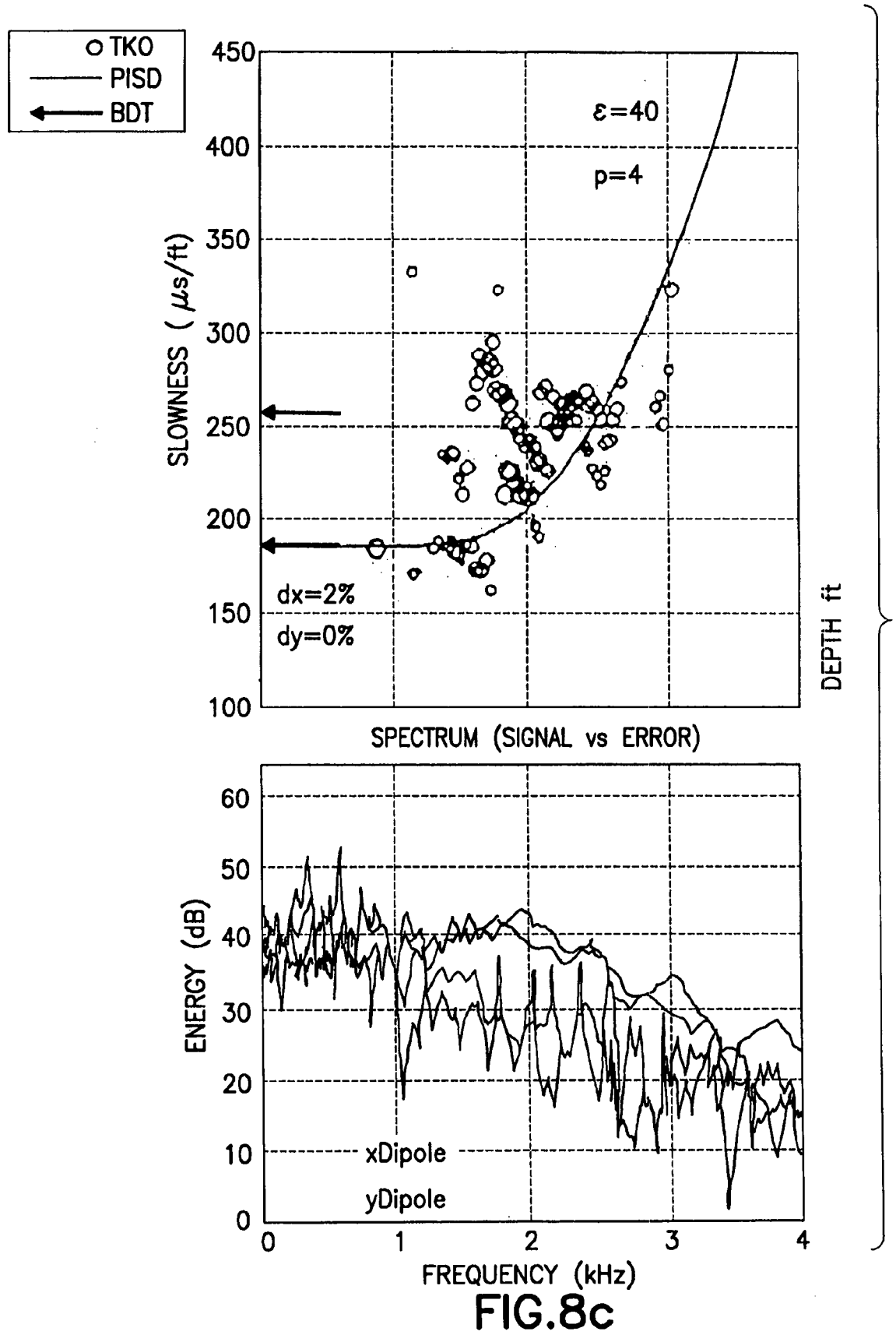
FIG. 8c shows dispersion curves calculated according to the invention for the waveforms of FIGS. 8a and 8b overlaid on results from other techniques.

The dispersions curves of FIG. 8c, representing the depth of 3048.0 ft, and the overlaid results of other techniques reveal that SPI works well in the presence of noise. In particular, the scattered results of TKO show that the noise level is very high. However, the results of SPI are very similar to the results of DSTC in this noisy region.

Figure 9B:
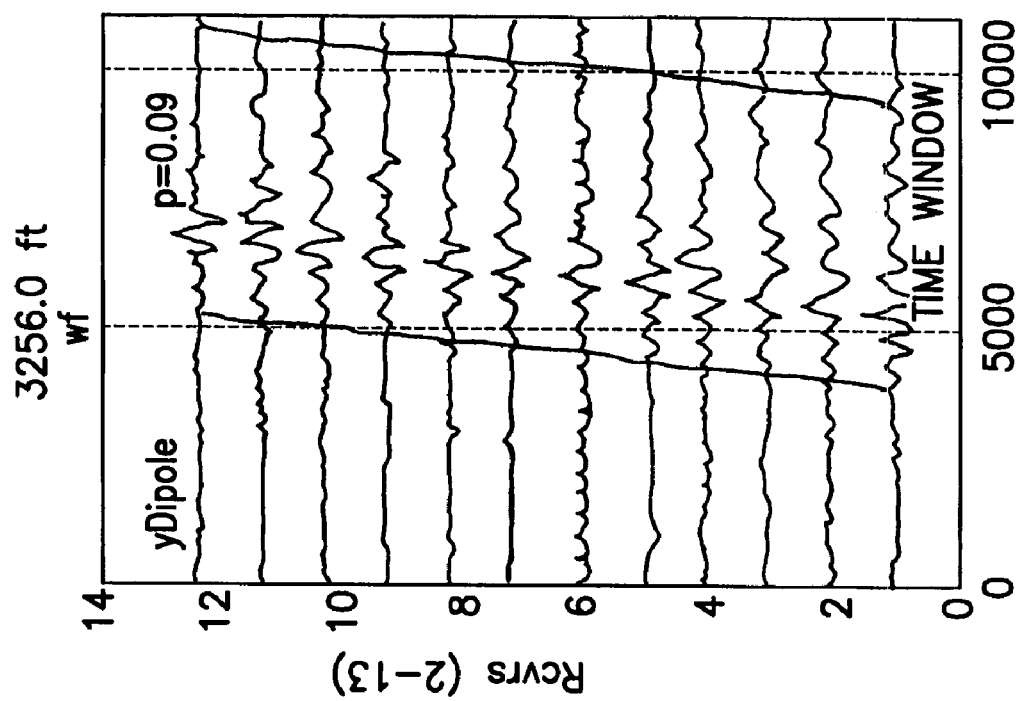
Figure 9A:
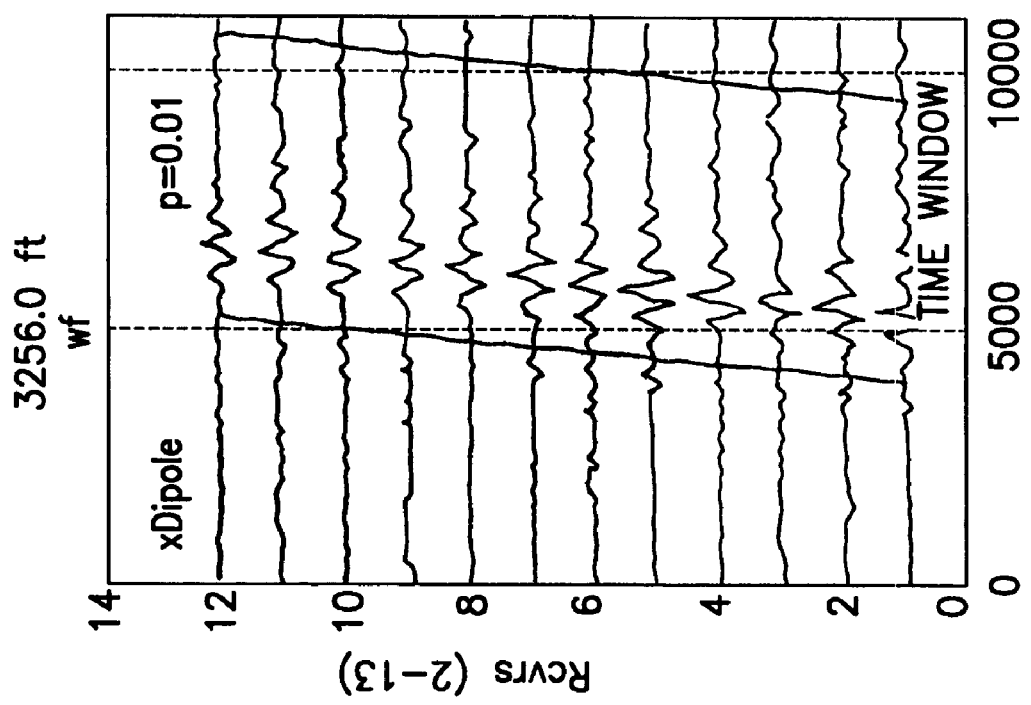
Figure 9C:
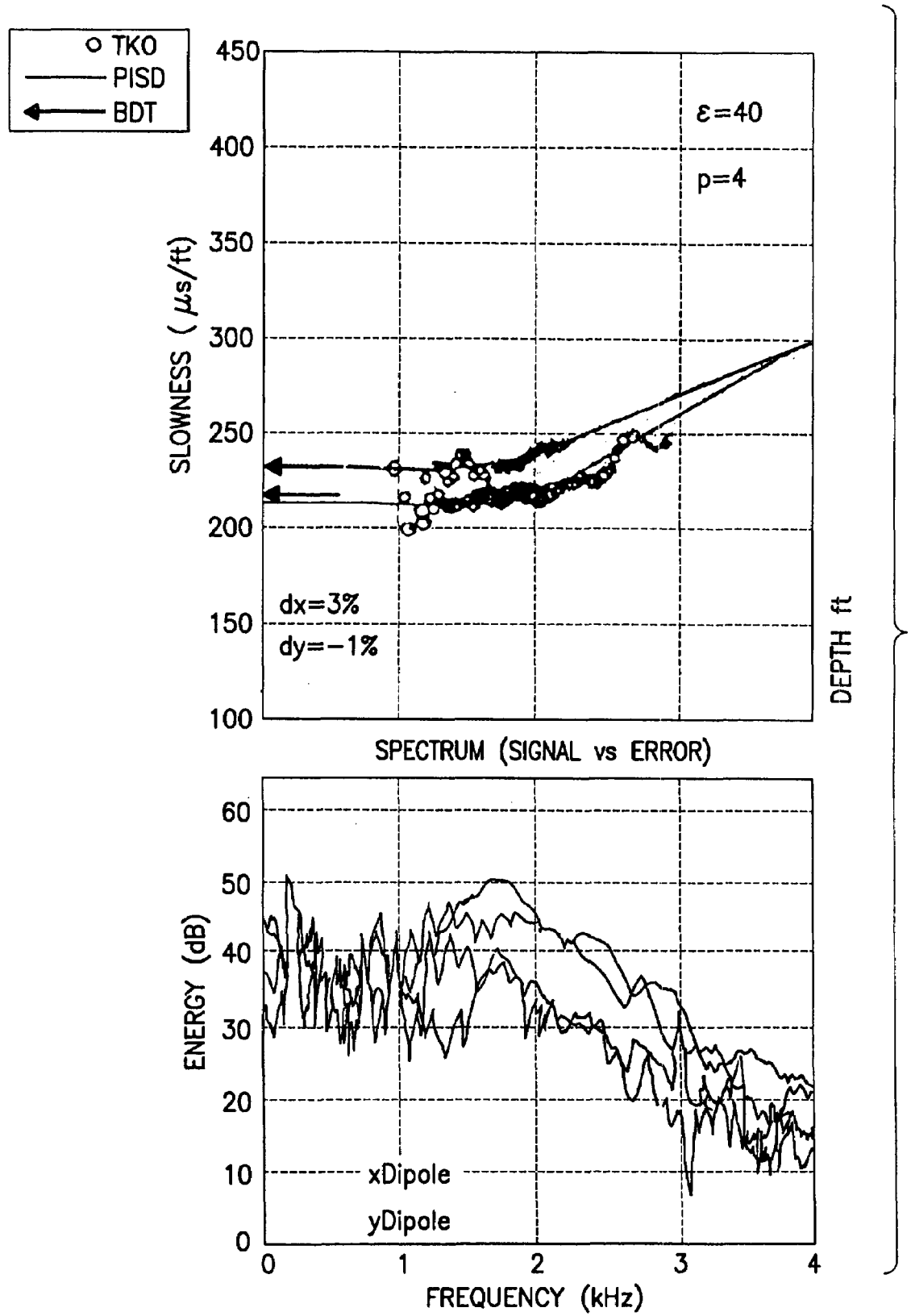
FIG. 9c shows dispersion curves calculated according to the invention for the waveforms of FIGS. 9a and 9b overlaid on results from other techniques.

FIG. 9c are dispersion curves calculated according to the invention for the waveforms of FIGS. 9a and 9b at 3256.0 ft. The dispersion curves show good agreement with TKO results and provide shear slownesses which differ from DSTC determinations by 3% and −1% respectively for the x-shear and y-shear. The dispersion curves of FIG. 9c are of particular interest in that they are substantially parallel to each other but displaced by a considerable distance. This is indicative of a formation which is intrinsically anisotropic. The shear anisotropy at 3256.0 feet was determined to be over 15% (see FIG. 6b).

Figure 10B:
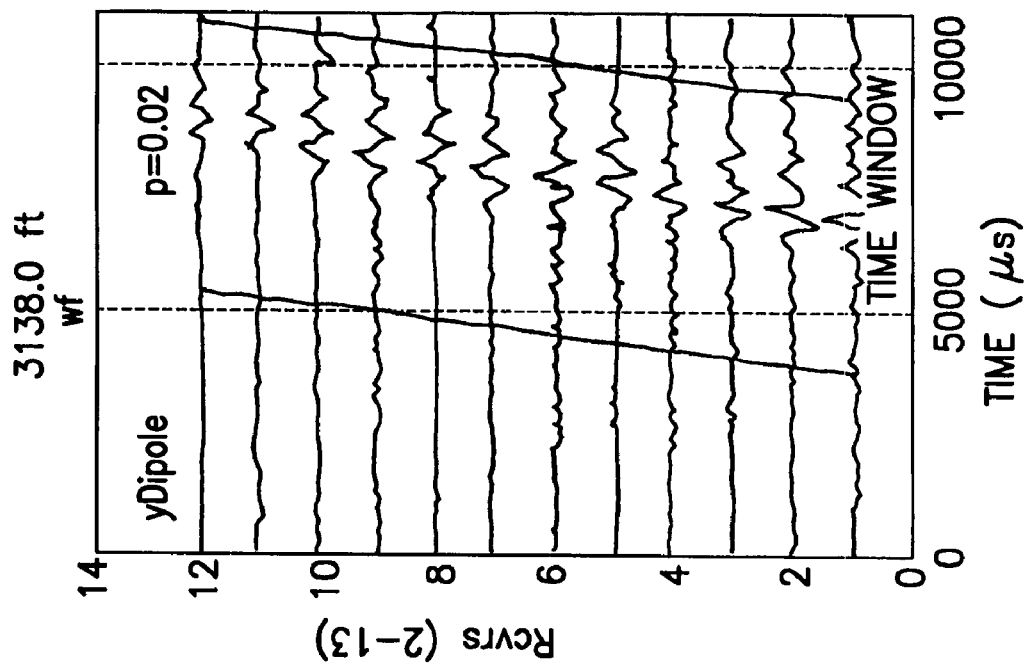
Figure 10A:
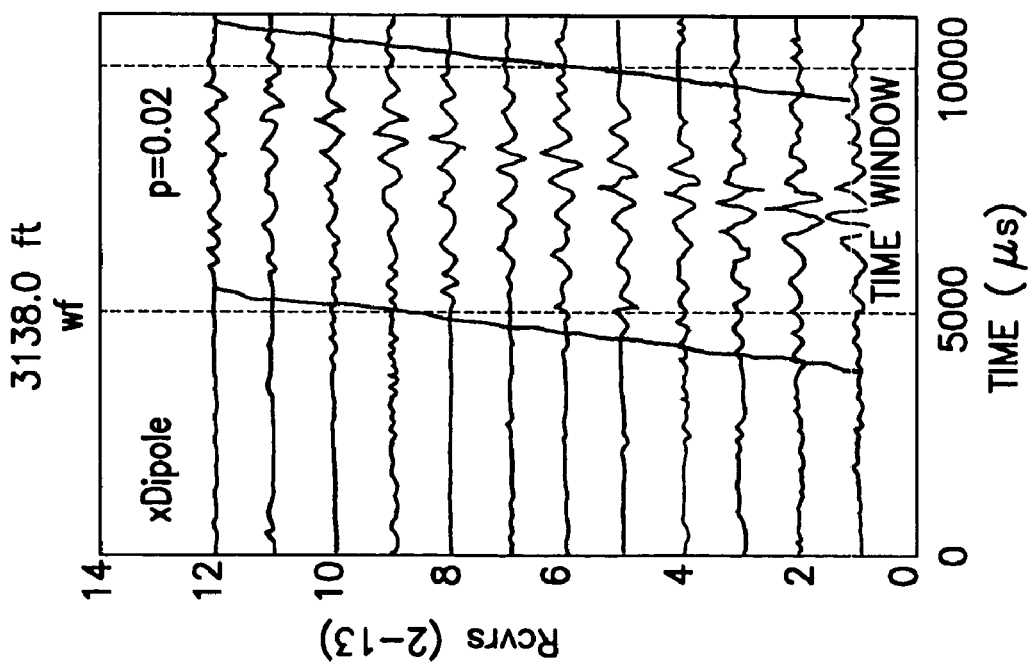
Figure 10C:
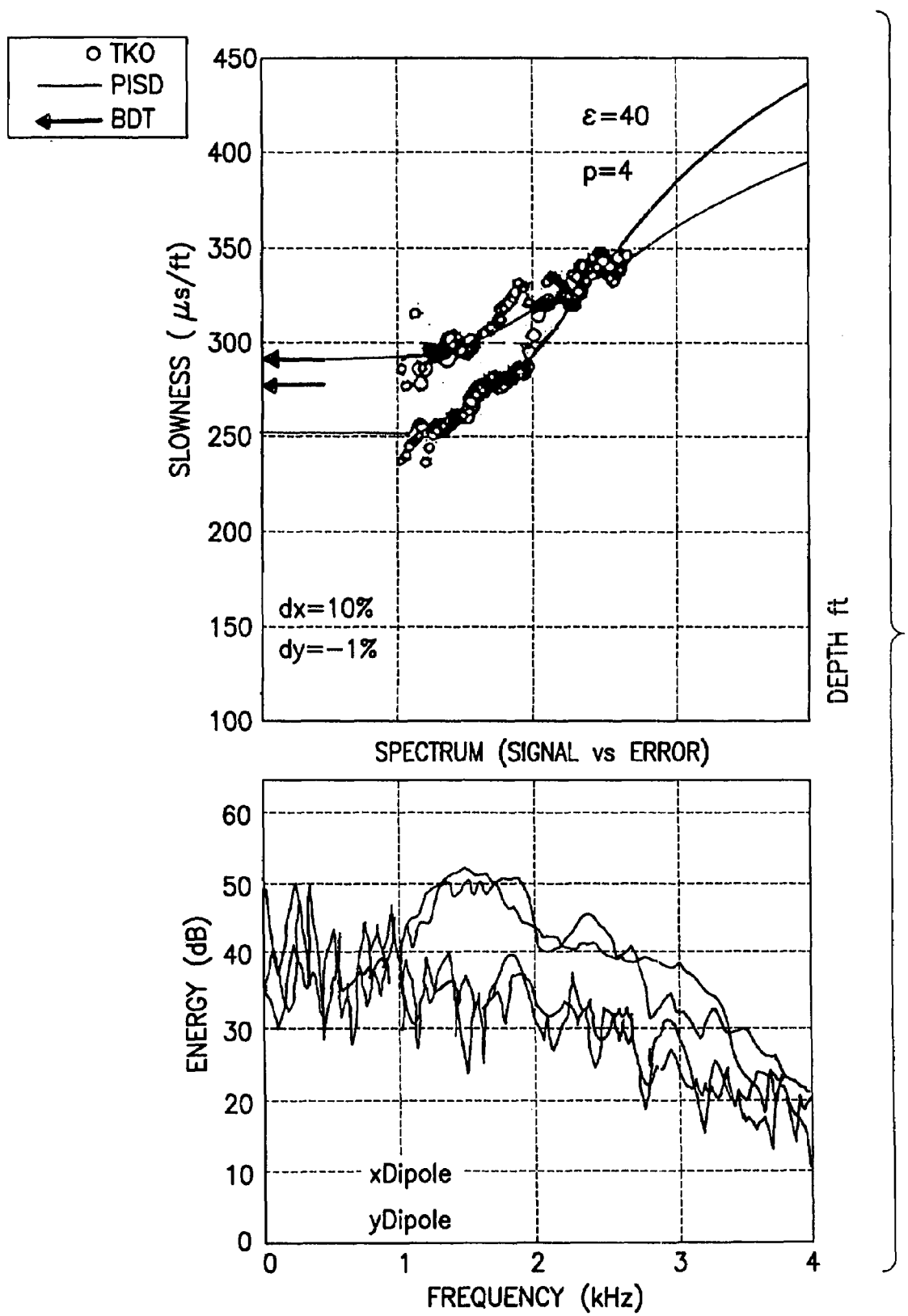
FIG. 10c shows dispersion curves calculated according to the invention for the waveforms of FIGS. 10a and 10b overlaid on results from other techniques.

FIG. 10c provides dispersion curves for the formation at 3138.0 ft. The dispersion curves of FIG. 10c are of particular interest for several reasons. First, while the SPI results appear to agree with the TKO results, the difference between SPI and DSTC is large (i.e., 10%) with respect to the x-shear determination. Second, the shear anisotropy at 3138.0 ft is seen to be large (over 15%). Third, the dispersion curves of FIG. 10c cross over each other. The cross-over is indicative of stress-induced anisotropy. An indication of the magnitude of the stress-induced anisotropy can be taken as the area between the x-dipole and y-dipole dispersion curves below the cross-over frequency times the area between the curves above the cross-over frequency.

Figure 11B:
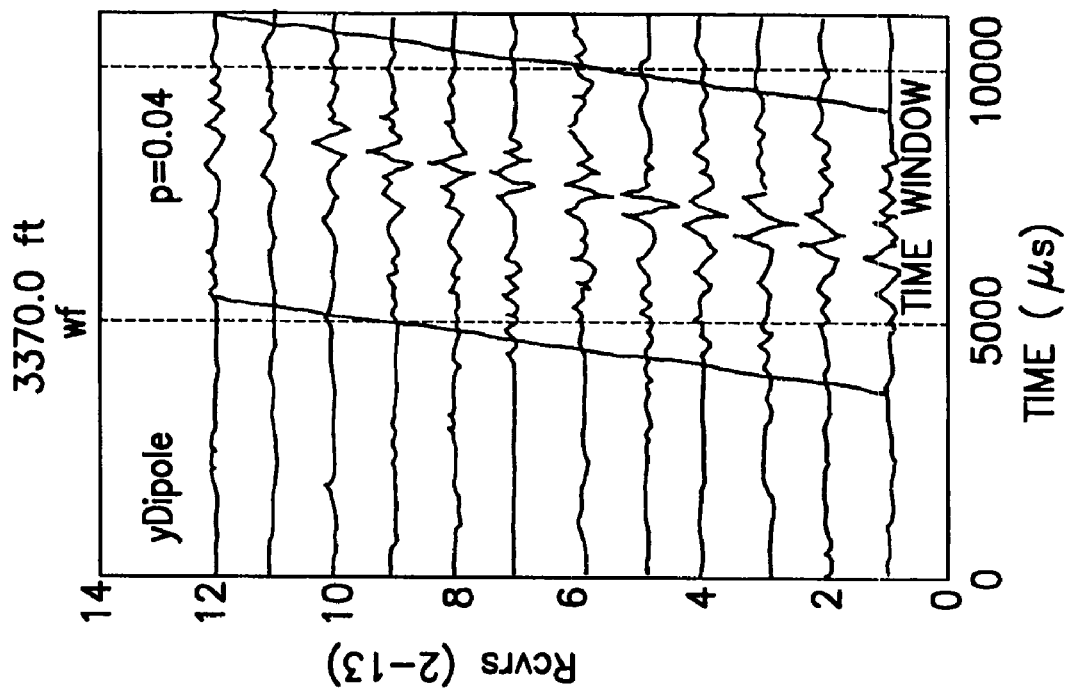
Figure 11A:
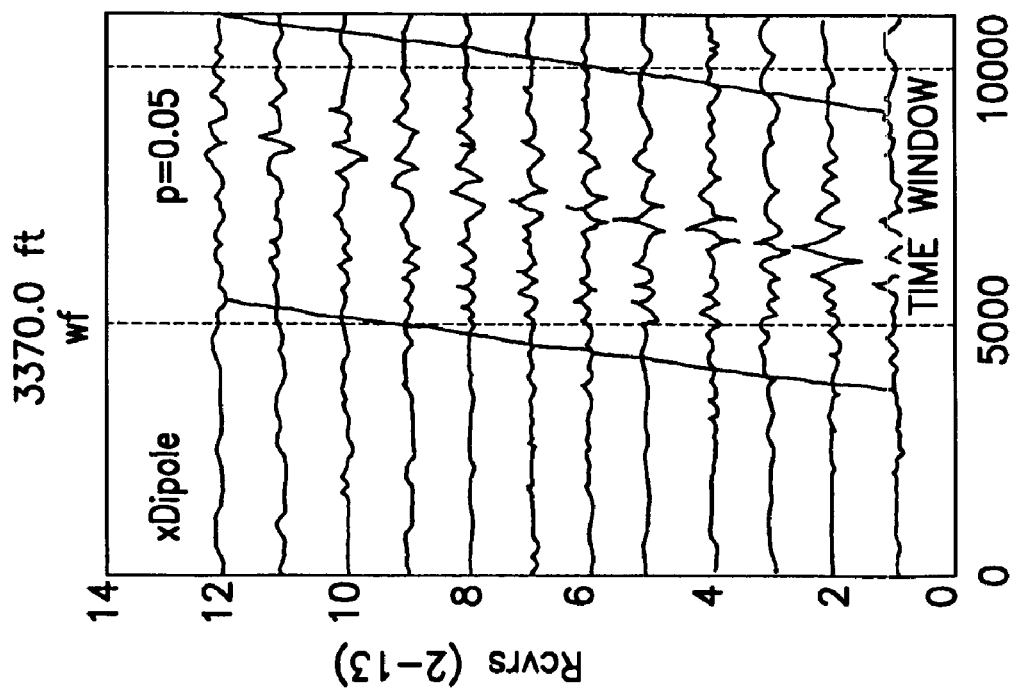
Figure 11C:
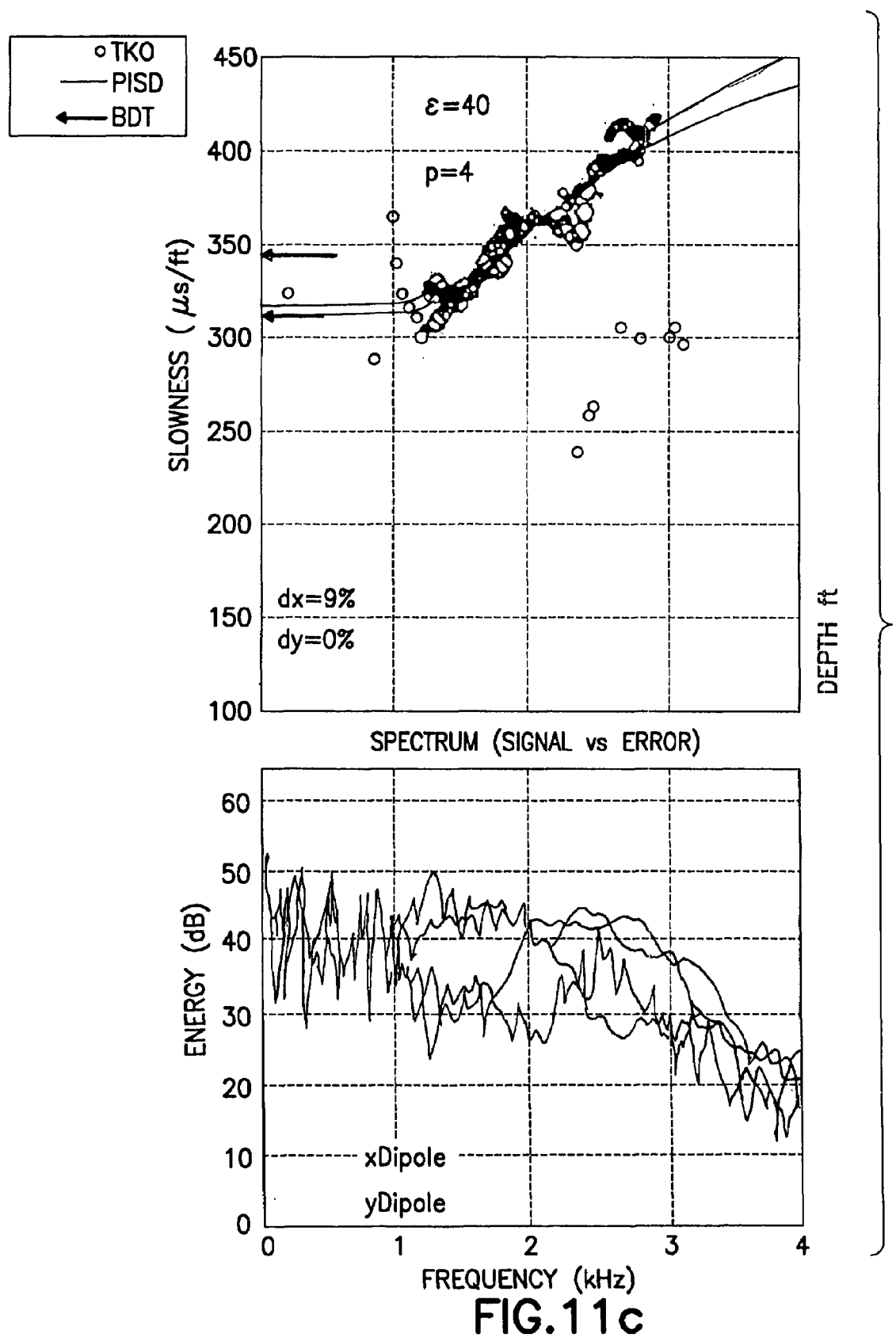
FIG. 11c shows dispersion curves calculated according to the invention for the waveforms of FIGS. 11a and 11b overlaid on results from other techniques.

The dispersion curves of FIG. 11c at 3370.0 ft are of particular interest for three reasons. First, the cross-over of the dispersion curves suggests that the formation at 3370.0 ft has stress anisotropy. Second, the steep slope of the dispersions curves (resulting in a significant difference between the shear slowness at 0 Hz and 2.5 kHz) suggests significant alteration of the formation at 3370.0 ft. Thus, using an indicator of alteration which is calculated by subtracting the formation slowness at 0 kHz from the formation slowness at 2.5 kHz and averaging the difference obtained for the x-dipole data and the y-dipole data, an alteration index of about 75 is obtained. Third, the difference between SPI and DSTC is large (i.e., 10%) with respect to the x-shear determination.

There have been described and illustrated herein methods and apparatus for processing dispersive wave information in order to determine the formation shear slowness. While particular embodiments have been described, it is not intended that the invention be limited thereby, as it is intended that the invention be as broad in scope as the art will allow. Thus, while the invention was described primarily in terms of utilizing dispersive flexural waves in order to make desired measurements and determinations, it will be appreciated that other dispersive or non-dispersive waves could be utilized. Also, while different details of embodiments for processing the signals obtained by the receivers were described, and numerous equations were set forth for describing the processing, it will be appreciated that other processing methods and equations could be utilized provided that a parametric expression for the dispersion curve is utilized. Further, while particular parameters were described for parameterizing the dispersion curves, it will be appreciated that other parameters and different numbers of parameters could be utilized. For example, instead of using normalized frequencies, non-normalized frequencies could be utilized. Also, instead of using a kick frequency and a flexion frequency, the Bessel function parameters α and β could be utilized. Further, instead of using slownesses at first and second (normalized) frequencies, depending upon which other parameters are utilized, fewer or more slownesses could be utilized. In fact, one or more of the parameters (e.g., a slowness at a certain frequency) could be set at a fixed value.

It will also be appreciated by those skilled in the art that while particular apparatus were described as preferred, such as a tool utilizing x- and y-dipole sources and a particular number dipole receivers, it will be appreciated that other types and different numbers of sources and receivers could be utilized. In fact, it should be appreciated that various aspects of the invention can be implemented utilizing only x-dipole or only y-dipole sources. Similarly, it will be appreciated that the processing means for processing the obtained wave signals can take any of numerous forms such as a computer, dedicated circuitry, etc. Therefore, it will be appreciated by those skilled in the art that yet other modifications could be made to the provided invention without deviating from its spirit and scope as so claimed.

What is claimed is:

1. A method for determining a characteristic of a formation traversed by a borehole, comprising the steps of:
   a) obtaining signals from a plurality of sonic detectors, which signals include dispersive waveform information;
   b) Fourier transforming at least a portion of said signals to obtain Fourier transformed signals;
   c) backpropagating said Fourier transformed signals utilizing a dispersion curve defined by a plurality of parameters to obtain a set of backpropagated signals, said plurality of parameters including at least one of (i) a slowness at an indication of first frequency and a slowness at an indication of second frequency, (ii) an indication of a kick-in frequency, and (iii) and an indication of a flexion frequency;
   d) modifying at least two of said plurality of parameters according to a search algorithm, and repeating said backpropagating step a plurality of times with modified parameters; and
   e) using sets of backpropagated signals, identifying a best-fit dispersion curve for at least one depth of the formation.

2. A method according to claim 1, further comprising: plotting said best-fit dispersion curve.

3. A method according to claim 2, wherein: said step of using sets of backpropagated signals includes stacking the backpropagated signals of each set to provide stacked sets, and using the stacked sets to determine semblances.

4. A method according to claim 3, wherein: said step of using further comprises, finding a maximum semblance of said semblances, said maximum semblance being associated with said best-fit dispersion curve.

5. A method according to claim 1, further comprising: utilizing said best fit dispersion curve, determining a shear slowness value at said depth.

6. A method according to claim 1, further comprising: repeating steps a) through e) for a plurality of depths of said formation, and utilizing best-fit dispersion curves for each of said plurality of depths, determining shear slowness values at said plurality of depths.

7. A method according to claim 6, further comprising: plotting said formation shear slowness values as a function of depth.

8. A method according to claim 1, wherein: said plurality of parameters includes at least said a slowness at an indication of first frequency and a slowness at an indication of second frequency.

9. A method according to claim 1, wherein: said plurality of parameters includes at least one of said indication of a kick-in frequency and said indication of a flexion frequency.

10. A method according to claim 1, wherein: said plurality of parameters includes at least four parameters including (i) slowness at an indication of first frequency, (ii) slowness at an indication of second frequency, (iii) an indication of a kick-in frequency, and (iv) an indication of a flexion frequency.

11. A method according to claim 10, wherein: said indication of first frequency is a first normalized frequency, said indication of second frequency is a second normalized frequency, said indication of a kick-in frequency is a normalized kick-in frequency, and said indication of a flexion frequency is a normalized kick-in frequency.

12. A method according to claim 11, wherein: a first of said plurality of dispersion curves is parameterized by a normalized kick-in frequency of between 0.9 and 1.1.

13. A method according to claim 12, wherein: said first of said plurality of dispersion curves is parameterized by a normalized flexion frequency of between 1.5 and 1.7.

14. A method according to claim 13, wherein: said first of said plurality of dispersion curves is parameterized by a normalized first frequency below said normalized flexion frequency and below said normalized kick-in frequency and a normalized second frequency above said normalized flexion frequency and above said normalized kick-in frequency.

15. A method for determining a characteristic of a formation traversed by a borehole, comprising the steps of:
   a) obtaining signals from a plurality of sonic detectors, which signals include dispersive waveform information;
   b) Fourier transforming at least a portion of said signals to obtain Fourier transformed signals;
   c) backpropagating said Fourier transformed signals utilizing a dispersion curve defined by a plurality of parameters to obtain a set of backpropagated signals
   d) modifying at least two of said plurality of parameters according to a search algorithm, and repeating said backpropagating step a plurality of times with modified parameters; and
   e) using sets of backpropagated signals, identifying a best-fit dispersion curve for at least one depth of the formation; and
   f) conducting steps a) through e) for x-directed signals and y-directed signals in order to obtain two best-fit dispersion curves for said at least one depth of the formation.

16. A method according to claim 15, further comprising:
g) utilizing said two best-fit dispersion curves, determining two shear slowness values at said depth.

17. A method according to claim 16, further comprising:
h) quantifying shear anistropy for said depth as a function of said two shear slowness values.

18. A method according to claim 17, further comprising: repeating steps a) through h) for a plurality of depths of said formation, and utilizing said shear anistropy at each of said plurality of depths, plotting said shear anisotropy along said depths.

19. A method according to claim 15, further comprising: comparing said two best-fit dispersion curves for said at least one depth of the formation in order to determine at least one of an indication of stress-induced anisotropy and an indication of formation alteration for said at least one depth.

20. A method for determining a characteristic of a formation traversed by a borehole, comprising the steps of:
  a) obtaining signals from a plurality of sonic detectors, which signals include dispersive waveform information;
  b) Fourier transforming at least a portion of said signals to obtain Fourier transformed signals;
  c) backpropagating said Fourier transformed signals utilizing a dispersion curve defined by a plurality of parameters to obtain a set of backpropagated signals
  d) modifying at least two of said plurality of parameters according to a search algorithm, and repeating said backpropagating step a plurality of times with modified parameters; and
  e) using sets of backpropagated signals, identifying a best-fit dispersion curve for at least one depth of the formation, wherein
    said dispersion curve defined by a plurality of parameters is Bessel-function based.

21. A method of analyzing dispersive sonic wave data obtained in a borehole resulting from generated sonic signals, said method comprising the steps of:
  a) determining an initial set of parameter values for a parametric expression having a plurality of parameters and capable of fitting sonic dispersion data, thereby defining an initial dispersion curve, said plurality of parameters including at least one of (i) a slowness at an indication of first frequency and a slowness at an indication of second frequency. (ii) an indication of a kick-in frequency, and (iii) and an indication of a flexion frequency;
  b) first processing said sonic wave data utilizing said dispersion curve and comparing a result of said first processing to obtain an indication of fit;
  c) varying one or more of said parameter values, thereby defining an alternative dispersion curve;
  d) next processing said sonic wave data utilizing said alternate dispersion curve and comparing a next result of said next processing to obtain another indication of fit;
  e) repeating steps c) and d) so that said parameter values for at least two of said plurality of parameters are varied, and until a set of parameters are identified that define a dispersion curve resulting in a best fit.

22. A method according to claim 21, wherein:
said parametric expression is capable of accurately fitting sonic dispersion data from isotropic formations, intrinsic and stress induced anisotropic formations, and formations with alterations.

23. A method according to claim 21, wherein:
said parametric expression is Bessel function based.

24. A method according to claim 21, wherein:
said parametric expression has four or more parameters.

25. A method according to claim 24, wherein:
said plurality of parameters includes all of
said slowness at an indication of first frequency,
said slowness at an indication of second frequency,
said indication of a kick-in frequency, and
said indication of a flexion frequency.

26. A method according to claim 21, wherein:
said parametric equation can be expressed as $$s(\tilde{f}) = s(\tilde{f}_1) + [s(\tilde{f}_2) - s(\tilde{f}_1)] \frac{J_{\alpha/\tilde{f}}(\beta) - J_{\alpha/\tilde{f}_1}(\beta)}{J_{\alpha/\tilde{f}_2}(\beta) - J_{\alpha/\tilde{f}_1}(\beta)}$$

where $J_{\alpha/\tilde{f}}$ is the Bessel function of the first kind with order of $\alpha/\tilde{f}$, $\tilde{f}$ ia a normalized frequency, $s(\tilde{f})$ is a slowness at a normalized frequency, and $\beta$ is a Bessel-function parameter.

27. A method according to claim 21, further comprising:
plotting said best-fit dispersion curve.

28. A method according to claim 21, wherein:
said first processing comprises Fourier transforming at least a portion of said dispersive sonic wave data to obtain Fourier transformed signals, backpropagating said Fourier transformed signals utilizing said dispersion curve to obtain a set of backpropagated signals, and stacking the backpropagated signals to provide a stacked set, and using the stacked sets to determine said indication of fit.

29. A method according to claim 28, wherein:
said indication of fit is a semblance.

30. A method according to claim 28, wherein:
said next processing comprises Fourier transforming at least a portion of said dispersive sonic wave data to obtain Fourier transformed signals, backpropagating said Fourier transformed signals utilizing said alternate dispersion curve to obtain another set of backpropagated signals, and stacking the other set of backpropagated signals to provide another stacked set, and using the another stacked set to determine another said indication of fit.

31. A method according to claim 30, wherein:
said indication of fit is a semblance, said another indication of fit is another semblance, and said best fit is a maximum semblance of said semblances.

32. A method according to claim 21, further comprising:
utilizing said best fit, determining a shear slowness value.

33. A method according to claim 32, further comprising:
repeating steps a) through e) for a plurality of depths of said formation, and utilizing best-fit dispersion curves for each of said plurality of depths, determining shear slowness values at said plurality of depths.

34. A method according to claim 33, further comprising:
plotting said formation shear slowness values as a function of depth.

35. A method of analyzing dispersive sonic wave data obtained in a borehole resulting from generated sonic signals, said method comprising the steps of:
  a) determining an initial set of parameter values for a parametric expression having a plurality of parameters and capable of fitting sonic dispersion data, thereby defining an initial dispersion curve;
  b) first processing said sonic wave data utilizing said dispersion curve and comparing a result of said first processing to obtain an indication of fit;
  c) varying one or more of said parameter values, thereby defining an alternative dispersion curve;
  d) next processing said sonic wave data utilizing said alternate dispersion curve and comparing a next result of said next processing to obtain another indication of fit;
  e) repeating steps c) and d) until a set of parameters are identified that define a dispersion curve resulting in a best fit; and f) conducting steps a) through e) for x-directed signals and y-directed signals in order to obtain two best-fit dispersion curves for a depth of the formation.

36. A method according to claim 35, further comprising:
g) utilizing said two best-fit dispersion curves, determining two shear slowness values at said depth.

37. A method for determining a characteristic of a formation traversed by a borehole, comprising:
a) obtaining signals from a plurality of sonic detectors, which signals include dispersive waveform information;
b) Fourier transforming at least a portion of said signals to obtain Fourier transformed signals;
c) backpropagating said Fourier transformed signals utilizing a plurality of dispersion curves defined by a plurality of parameters including at least two of
   (i) slowness at an indication of first frequency,
   (ii) slowness at an indication of second frequency, (iii) an indication of a kick-in frequency, and
   (iv) an indication of a flexion frequency,
to obtain a plurality of sets of backpropagated signals;
d) stacking said backpropagated signals of each set to provide stacked sets;
e) using said stacked sets to determine an indication of a formation characteristic.

38. A method according to claim 37, wherein:
said plurality of dispersion curves are obtained by varying at least two of said plurality of parameters over ranges according to a search algorithm.

39. A method according to claim 37, wherein:
said step of using said stacked sets comprises obtaining semblances for each of said stacked sets.

40. A method according to claim 39, wherein:
said step of using further comprises, finding a maximum semblance, said maximum semblance being associated with a particular dispersion curve, and
identifying a formation shear slowness based on said dispersion curve of maximum semblance, wherein said formation shear slowness is said characteristic.

41. A method according to claim 40, further comprising:
repeating steps a) through e) for a plurality of depths of said formation, and plotting said formation shear slowness as a function of depth.

42. A method according to claim 37, wherein:
said indication of first frequency is a first normalized frequency, said indication of second frequency is a second normalized frequency, said indication of a kick-in frequency is a normalized kick-in frequency, and said indication of a flexion frequency is a normalized kick-in frequency.

43. A method according to claim 42, wherein:
a first of said plurality of dispersion curves is parameterized by a normalized kick-in frequency of between 0.9 and 1.1.

44. A method according to claim 43, wherein:
said first of said plurality of dispersion curves is parameterized by a normalized flexion frequency of between 1.5 and 1.7.

45. A method according to claim 42, wherein:
said first of said plurality of dispersion curves is parameterized by a normalized first frequency below said normalized flexion frequency and below said normalized kick-in frequency and a normalized second frequency above said normalized flexion frequency and above said normalized kick-in frequency.

46. A method according to claim 37, wherein:
said indication of a formation characteristic is a best-fit dispersion curve for a depth of the formation.

47. A method according to claim 46, further comprising:
f) conducting steps a) through e) for x-directed signals and y-directed signals in order to obtain two best-fit dispersion curves for said at least one depth of the formation.

48. A method according to claim 47, further comprising:
g) utilizing said two best-fit dispersion curves, determining two shear slowness values at said depth.

49. A method according to claim 48, further comprising:
h) quantifying shear anistropy for said depth as a function of said two shear slowness values.

50. A method according to claim 49, further comprising:
repeating steps a) through h) for a plurality of depths of said formation, and utilizing said shear anistropy at each of said plurality of depths, plotting said shear anisotropy along said depths.

51. A method according to claim 47, further comprising:
comparing said two best-fit dispersion curves for said at least one depth of the formation in order to determine at least one of an indication of stress-induced anisotropy and an indication of formation alteration for said at least one depth.

52. A method according to claim 46, wherein:
said dispersion curves defined by a plurality of parameters are Bessel-function based.

53. A method according to claim 37, further comprising:
prior to said step of stacking, inverse Fourier transforming said plurality of sets of backpropagated signals to provide time domain sets, wherein said stacked sets of steps d) and e) are stacked time domain sets.

54. A method according to claim 43, further comprising:
after inverse Fourier transforming and prior to stacking, windowing said time domain sets to provide reduced time domain sets, wherein said stacked sets of steps d) and e) are stacked reduced time domain sets.

55. A method according to claim 37, wherein:
said Fourier transformed signals are backpropagated according to $X_i(f)=A_i(f)e^{-j2\pi f S_p(f,s(\tilde{f}_1),s(\tilde{f}_2),\tilde{f}_{kick},\tilde{f}_{flex})(i-1)\delta}$
where $X_i(f)$ is said backpropagated signal at frequency f and at an i'th of said plurality of sonic detectors, $A_i(f)$ is said Fourier transformed signal at said frequency f and at said i'th detector, β is an inter-detector spacing between any adjacent of said sonic detectors, and $S_p(f, s(\tilde{f}_1), s(\tilde{f}_2), \tilde{f}_{kick}, \tilde{f}_{flex})$ are said plurality of dispersion curves parameterized by $s(\tilde{f}_1)$, $s(\tilde{f}_2)$, $\tilde{f}_{kick}$ and $\tilde{f}_{flex}$ where $s(\tilde{f}_1)$ is said slowness at an indication of first frequency, $s(\tilde{f}_2)$ is said slowness at an indication of second frequency, $\tilde{f}_{kick}$ is said indication of a kick-in frequency, and $\tilde{f}_{flex}$ is said indication of a flexion frequency.

56. A method according to claim 37, further comprising:
prior to Fourier transforming said signals, windowing said signals to provide sets of first reduced signals, which first reduced signals are Fourier transformed, backpropagated, and stacked.

57. Apparatus for determining characteristics of a formation traversed by a borehole, comprising:
a) a sonic source which generates substantially non-attenuating dispersive waves;
b) a plurality of sonic receivers which detect said non-attenuating dispersive waves generated by said sonic source and generate signals in response thereto; and c) a processor which
  (i) obtains said signals,
  (ii) processes said signals utilizing an initial dispersion curve defined by a parametric expression having a plurality of parameters with an initial set of parameter values and capable of fitting sonic dispersion data to obtain a result, said plurality of parameters including at least one of (I) a slowness at an indication of first frequency and a slowness at an indication of second frequency, (II) an indication of a kick-in frequency, and (III) and an indication of a flexion frequency;
  (iii) analyzing said result to obtain an indication of fit,
  (iv) varies one or more of said parameter values, thereby defining an alternative dispersion curve,
  (v) processes said signals utilizing said alternate dispersion curve to obtain another result,
  (vi) compares said another result to obtain another indication of fit, and
  (vii) repeats (iv), (v) and (vi) so that said parameter values for at least two of said plurality of parameters are varied, and until a set of parameters are identified that define a dispersion curve resulting in a best fit.

58. An apparatus according to claim 57, wherein:
said sonic means is a dipole source, and said plurality of sonic receiver means are dipole receivers.

59. Apparatus for determining characteristics of a formation traversed by a borehole, comprising:
  a) a sonic dipole source which generates substantially non-attenuating dispersive waves;
  b) a plurality of sonic receivers which detect said non-attenuating dispersive waves generated by said sonic source and generate signals in response thereto; and
  c) a processor which
    (i) obtains said signals.
    (ii) processes said signals utilizing an initial dispersion curve defined by a parametric expression with an initial set of parameter values and capable of fitting sonic dispersion data to obtain a result;
    (iii) analyzing said result to obtain an indication of fit,
    (iv) varies one or more of said parameter values, thereby defining an alternative dispersion curve.
    (v) processes said signals utilizing said alternate dispersion curve to obtain another result,
    (vi) compares said another result to obtain another indication of fit, and
    (vii) repeats (iv), (v) and (vi) until a set of parameters are identified that define a dispersion curve resulting in a best fit, wherein
  said dipole source includes an x-dipole source and a y-dipole source.

60. An apparatus according to claim 59, wherein:
said processor conducts (i) through (vii) for signals generated by both said x-dipole source and said y-dipole source to define an x-shear dispersion curve of best fit and a y-shear dispersion curve of best fit.

* * * * *